(12) United States Patent
Stewart

(10) Patent No.: US 7,604,178 B2
(45) Date of Patent: Oct. 20, 2009

(54) SMART TAG ACTIVATION

(75) Inventor: Roger Green Stewart, Morgan Hill, CA (US)

(73) Assignee: Intelleflex Corporation, San Jose, CA (US)

( * ) Notice: Subject to any disclaimer, the term of this patent is extended or adjusted under 35 U.S.C. 154(b) by 477 days.

(21) Appl. No.: 11/127,910

(22) Filed: May 11, 2005

(65) Prior Publication Data
US 2006/0255131 A1 Nov. 16, 2006

(51) Int. Cl.
*H04Q 5/22* (2006.01)
*G08B 13/14* (2006.01)

(52) U.S. Cl. .............. 235/492; 340/10.1; 340/572.1

(58) Field of Classification Search ............. 235/492, 235/383; 340/10.1, 10.4, 10.41, 10.42, 572.1
See application file for complete search history.

(56) References Cited

U.S. PATENT DOCUMENTS

| | | | |
|---|---|---|---|
| 3,689,885 A | 9/1972 | Kaplan et al. ............ 340/152 T |
| 3,890,581 A | 6/1975 | Stuart et al. ............... 332/11 R |
| 4,325,146 A | 4/1982 | Lennington ................ 455/604 |
| 4,525,713 A | 6/1985 | Barletta et al. ......... 340/825.54 |
| 4,646,090 A | 2/1987 | Mawhinney ................ 342/44 |
| 4,730,188 A | 3/1988 | Milheiser .................... 340/825 |
| 4,839,642 A | 6/1989 | Batz et al. ............ 340/825.54 |
| 4,879,756 A | 11/1989 | Stevens et al. ................ 455/39 |
| 4,928,275 A | 5/1990 | Moore et al. ................ 370/102 |
| 4,937,586 A | 6/1990 | Stevens et al. ............. 343/702 |
| 4,955,038 A | 9/1990 | Lee et al. ...................... 375/35 |
| 5,028,918 A | 7/1991 | Giles et al. ............ 340/825.54 |
| 5,041,826 A | 8/1991 | Milheiser ............... 340/825.54 |
| 5,109,221 A | 4/1992 | Lambropoulos et al. ..................... 340/825.69 |
| 5,166,676 A | 11/1992 | Milheiser ............... 340/825.54 |
| 5,245,332 A | 9/1993 | Katzenstein ........... 340/825.54 |
| 5,305,008 A | 4/1994 | Turner et al. ................... 342/44 |
| 5,345,231 A | 9/1994 | Koo et al. .............. 340/870.31 |
| 5,410,315 A | 4/1995 | Huber .......................... 342/42 |
| 5,489,908 A | 2/1996 | Orthmann et al. ............. 342/42 |
| 5,491,482 A | 2/1996 | Dingwall et al. .............. 342/42 |
| 5,502,445 A | 3/1996 | Dingwall et al. .............. 342/51 |
| 5,521,601 A | 5/1996 | Kandlur et al. ................ 342/44 |
| 5,525,992 A | 6/1996 | Froschermeier .............. 342/42 |
| 5,530,702 A | 6/1996 | Palmer et al. .............. 370/85.3 |
| 5,548,291 A | 8/1996 | Meier et al. .................... 342/51 |
| 5,550,536 A | 8/1996 | Flaxl ...................... 340/825.54 |
| 5,606,313 A | 2/1997 | Allen et al. ............ 340/825.54 |
| 5,621,412 A | 4/1997 | Sharpe et al. .................. 342/51 |
| 5,673,037 A | 9/1997 | Cesar et al. ............ 340/825.54 |
| 5,684,828 A | 11/1997 | Bolan et al. .................. 375/238 |
| 5,774,064 A | 6/1998 | Lambropoulos et al. ...................... 340/825.69 |
| 5,838,257 A | 11/1998 | Lambropoulos ....... 340/825.54 |
| 5,856,788 A | 1/1999 | Walter et al. .......... 340/825.54 |

(Continued)

OTHER PUBLICATIONS

International Search Report and Written Opinion from PCT Application No. PCT/US06/08321 mailed on Jul. 15, 2008.

(Continued)

*Primary Examiner*—Daniel A Hess
(74) *Attorney, Agent, or Firm*—Zilka-Kotab, PC

(57) ABSTRACT

Systems and methods for activating devices such as RFID tags includes activating a device if an activate command matches a value stored on the device. The activate command can also define which mode of operation or state the device will initiation in, and whether an additional function or functions is to be performed upon activation. Activate commands can also be dynamically assigned to devices in order to increase overall efficiency.

63 Claims, 18 Drawing Sheets

U.S. PATENT DOCUMENTS

| | | | |
|---|---|---|---|
| 5,887,176 A | 3/1999 | Griffith et al. | 395/750 |
| 6,067,171 A * | 5/2000 | Yamada et al. | 358/406 |
| 6,104,333 A | 8/2000 | Wood, Jr. | 341/173 |
| 6,130,602 A | 10/2000 | O'Toole et al. | 340/10.33 |
| 6,130,603 A | 10/2000 | Briechle | 340/10.34 |
| 6,150,921 A | 11/2000 | Werb et al. | 340/10.1 |
| 6,172,596 B1 | 1/2001 | Cesar et al. | 340/10.41 |
| 6,177,858 B1 | 1/2001 | Raimbault et al. | 340/10.1 |
| 6,239,690 B1 | 5/2001 | Burbidge et al. | 340/10.33 |
| 6,249,212 B1 | 6/2001 | Beigel et al. | 340/10.34 |
| 6,265,963 B1 | 7/2001 | Wood, Jr. | 340/10.4 |
| 6,278,698 B1 | 8/2001 | O'Toole et al. | 370/311 |
| 6,310,558 B1 | 10/2001 | Minami | 340/825.52 |
| 6,333,690 B1 | 12/2001 | Nelson et al. | 340/539 |
| 6,337,634 B1 | 1/2002 | O'Toole et al. | 340/825.56 |
| 6,342,830 B1 | 1/2002 | Want et al. | 340/10.1 |
| 6,351,215 B2 | 2/2002 | Rodgers et al. | 340/572.1 |
| 6,353,406 B1 | 3/2002 | Lanzl et al. | 342/118 |
| 6,362,738 B1 | 3/2002 | Vega | 340/572.1 |
| 6,377,203 B1 * | 4/2002 | Doany | 342/44 |
| 6,388,575 B1 | 5/2002 | Galloway | 340/572.1 |
| 6,411,199 B1 | 6/2002 | Geiszler et al. | 340/10.1 |
| 6,452,980 B1 | 9/2002 | Zalud et al. | 375/285 |
| 6,466,634 B1 | 10/2002 | O'Toole et al. | 375/374 |
| 6,469,618 B1 | 10/2002 | Gaultier | 340/10.3 |
| 6,535,109 B1 | 3/2003 | Mahdavi | 340/10.3 |
| 6,593,845 B1 | 7/2003 | Friedman et al. | 340/10.33 |
| 6,600,428 B1 | 7/2003 | O'Toole et al. | 340/825.36 |
| 6,603,391 B1 | 8/2003 | Greeff et al. | 340/10.3 |
| 6,611,198 B1 | 8/2003 | Geiszler et al. | 340/10.41 |
| 6,617,963 B1 | 9/2003 | Watters et al. | 340/10.41 |
| 6,630,885 B2 | 10/2003 | Hardman et al. | 340/505 |
| 6,653,937 B2 | 11/2003 | Nelson et al. | 340/539.1 |
| 6,661,336 B1 | 12/2003 | Atkins et al. | 340/10.2 |
| 6,690,264 B2 | 2/2004 | Dalglish | 340/10.4 |
| 6,693,511 B1 | 2/2004 | Seal | 340/10.1 |
| 6,696,879 B1 | 2/2004 | O'Toole et al. | 327/356 |
| 6,721,289 B1 | 4/2004 | O'Toole et al. | 370/311 |
| 6,735,183 B2 | 5/2004 | O'Toole et al. | 370/311 |
| 6,765,476 B2 | 7/2004 | Steele et al. | 340/10.4 |
| 6,765,484 B2 | 7/2004 | Eagleson et al. | 340/505 |
| 6,771,613 B1 | 8/2004 | O'Toole et al. | 370/277 |
| 6,774,685 B2 | 8/2004 | O'Toole et al. | 327/156 |
| 6,831,548 B1 | 12/2004 | Eber et al. | 340/10.33 |
| 7,245,213 B1 * | 7/2007 | Esterberg et al. | 340/539.12 |
| 7,375,637 B2 | 5/2008 | Mickle et al. | 40/572.1 |
| 2001/0050580 A1 | 12/2001 | O'Toole et al. | 327/158 |
| 2002/0024422 A1 | 2/2002 | Turner et al. | 340/10.3 |
| 2002/0063622 A1 | 5/2002 | Armstrong et al. | 340/10.31 |
| 2002/0109597 A1 | 8/2002 | Nelson et al. | 340/573.1 |
| 2002/0126005 A1 | 9/2002 | Hardman et al. | 340/442 |
| 2002/0175805 A9 | 11/2002 | Armstrong et al. | 340/10.31 |
| 2002/0175806 A1 | 11/2002 | Marneweck et al. | 340/10.33 |
| 2003/0104848 A1 | 6/2003 | Brideglall | 455/574 |
| 2003/0128100 A1 | 7/2003 | Burkhardt et al. | 340/5.8 |
| 2003/0149526 A1 | 8/2003 | Zhou et al. | 701/213 |
| 2004/0017291 A1 | 1/2004 | Hardman et al. | 340/505 |
| 2004/0027240 A1 | 2/2004 | Greeff et al. | 340/10.3 |
| 2004/0046642 A1 | 3/2004 | Becker et al. | 340/10.32 |
| 2004/0140884 A1 | 7/2004 | Gallagher, III et al. | 340/10.2 |
| 2004/0160306 A1 | 8/2004 | Stilp | 340/5.61 |
| 2004/0160309 A1 | 8/2004 | Stilp | 340/10.2 |
| 2004/0201457 A1 | 10/2004 | O'Toole et al. | 340/10.33 |
| 2004/0223481 A1 | 11/2004 | Juels et al. | 370/345 |
| 2005/0052279 A1 * | 3/2005 | Bridgelall | 340/10.1 |
| 2005/0052283 A1 | 3/2005 | Collins et al. | 340/572.7 |
| 2005/0057368 A1 | 3/2005 | Corbett et al. | 340/825.49 |
| 2005/0077349 A1 | 4/2005 | Bonalle et al. | 235/380 |

OTHER PUBLICATIONS

U.S. Appl. No. 60/673,715, filed on Apr. 21, 2005.

* cited by examiner

SMART TAG ACTIVATION

FIELD OF THE INVENTION

The present invention relates to Radio Frequency (RF) tag activation, and more particularly, this invention relates to functional activation of RF tags and other electronic RF devices.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the universal product code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates.

Currently cartons are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. Only with radio frequency identification ("RFID") does the physical layer of actual goods automatically tie into software applications, to provide accurate tracking.

The emerging RFID technology employs a radio frequency ("RF") wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects. RFID promises to radically transform the retail, pharmaceutical, military, and transportation industries.

The advantages of RFIDs over bar code are summarized in Table 1:

TABLE 1

| Barcode | RFID |
| --- | --- |
| Need line-of-sight to read | Identification without visual contact |
| Read only | Able to read/write |
| Only a barcode number | Able to store information in tag |
| Barcode number is fixed | Information can be renewed anytime |
| Category level tagging only-no unique item identifier | Unique item identification |

TABLE 1-continued

| Barcode | RFID |
| --- | --- |
| Unable to read if barcode is damaged | Can withstand harsh environment |
| Use once | Reusable |
| Low cost | Higher cost |
| Less Flexibility | Higher Flexibility/Value |

As shown in FIG. 1, an RFID system 100 includes a tag 102, a reader 104, and an optional server 106. The tag 102 includes an IC chip and an antenna. The IC chip includes a digital decoder needed to execute the computer commands that the tag 102 receives from the tag reader 104. The IC chip also includes a power supply circuit to extract and regulate power from the RF reader; a detector to decode signals from the reader; a backscatter modulator, a transmitter to send data back to the reader; anti-collision protocol circuits; and at least enough memory to store its EPC code.

Communication begins with a reader 104 sending out signals to find the tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, maximum range 3 m)
Lowest cost
Class-2
Memory tags (8 bits to 128 Mbits programmable at maximum 3 m range)
Security & privacy protection
Low cost
Class-3
Battery tags (256 bits to 64 Kb)
Self-Powered Backscatter (internal clock, sensor interface support)
100 meter range
Moderate cost
Class-4
Active tags
Active transmission (permits tag-speaks-first operating modes)
Up to 30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Early field trials have shown that the currently available passive short-range Class-1 and Class-2 tags are often inadequate for tagging pallets and many types of cases. The problems with these passive tags are particularly severe when working with "RF-unfriendly" materials like metal (like soup cans), metal foils (like potato chips), or conductive liquids (like soft drinks, shampoo). No one can consistently read case tags located in the interior of a stack of cases—as occurs in a warehouse or pallet. The existing passive tags are also inadequate to tag large or rapidly moving objects like trucks, cars, shipping containers, etc.

Class-3 tags solve this problem by incorporating batteries and signal preamplifiers to increase range. This battery will last many years if power consumption is managed well, but only a few days if power consumption is managed poorly. Because battery powered systems will coexist with passive Class-1 tags, care must be taken to reduce the power drain of the battery powered systems. If a Class-3 device is continually responding to commands for "other" devices, such as unwanted Class-1 instructions, battery power will be drained extremely quickly.

Wake up codes have been used in RFID tags to selectively "wake up" individual tags and not others, thereby conserving the battery life of the tags that are not needed and/or reducing the amount of signal received back from a given set of tags. Typically, the reader broadcasts a wake up code, and each tag activates just long enough to determine whether the broadcast code matches a code stored in the tag's memory. If the codes match, the tag fully activates. If the codes do not match, the tag returns to a hibernate state or does not respond further to the reader.

As implied by the previous paragraph, only two states are associated with a wake up command: activated and inactive. It would be desirable to extend the use of the activate commands and methods to invoke additional tag functionality.

SUMMARY OF THE INVENTION

Multiple variants of the activation wake up code are used, not just to wake up the tag, but also to help singulate the tag, control the initial state of the tag, and/or provide some other functionality. In one embodiment, as performed by a device such as an RFID tag in an RFID system of tags and an interrogator (reader), a method for activating a device includes listening for an activate command at a device, receiving the activate command, analyzing an activate code in the activate command, activating the device in a first mode if the activate code matches one of a plurality of values stored in the device, and activating the device in a second mode if the activate code matches another of the plurality of values stored in the device.

Another method includes listening for an activate command at a device, receiving the activate command, activating the device if the activate code matches one of a plurality of values stored in the device where at least one of the stored values has an additional device functionality associated therewith, and performing an additional function if the activate code matches one of the stored values having additional device functionality associated therewith.

Systems and methods for activating remote devices are also provided. One method for activating a remote device as performed by a device such as an RFID interrogator (reader) according to one embodiment includes selecting an activate command for sending to a remote device where the activate command indicates which of a plurality of modes the remote device will activate in, and sending the activate command to the remote device for causing the remote device to activate in one of the modes.

Another method for activating a remote device includes selecting an activate command for sending to a remote device, where the activate command activates the device if the activate code matches one of a plurality of values stored in the remote device. At least one of the stored values has an additional device functionality associated therewith, where an additional function is performed by the device if the activate code matches one of the stored values having additional device functionality associated therewith. The activate command is sent to the remote device.

A method for activating selected remote devices includes identifying each of a plurality of remote devices, assigning an activate code to at least some of the remote devices where the devices are activated upon receiving a code matching the activate code assigned thereto, and communicating with one of the remote devices, wherein the communication with the one of the remote devices is prefaced with the activate code for the one of the remote devices.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following specification describes systems and methods in which multiple variants of an activation or "wake up" code are used, not just to wake up the tag, but also to help singulate the tag, control the initial state of the tag, and/or provide some other functionality. To this end, copending U.S. patent application Ser. No. 11/007,973 filed Dec. 8, 2004 with title "BATTERY ACTIVATION CIRCUIT", and which is herein incorporated by reference, describes systems and methods for selectively activating tags. The teachings herein can be used to extend the capabilities of the systems and methods of the copending Application as well as other known and future activation systems.

Figure 1:
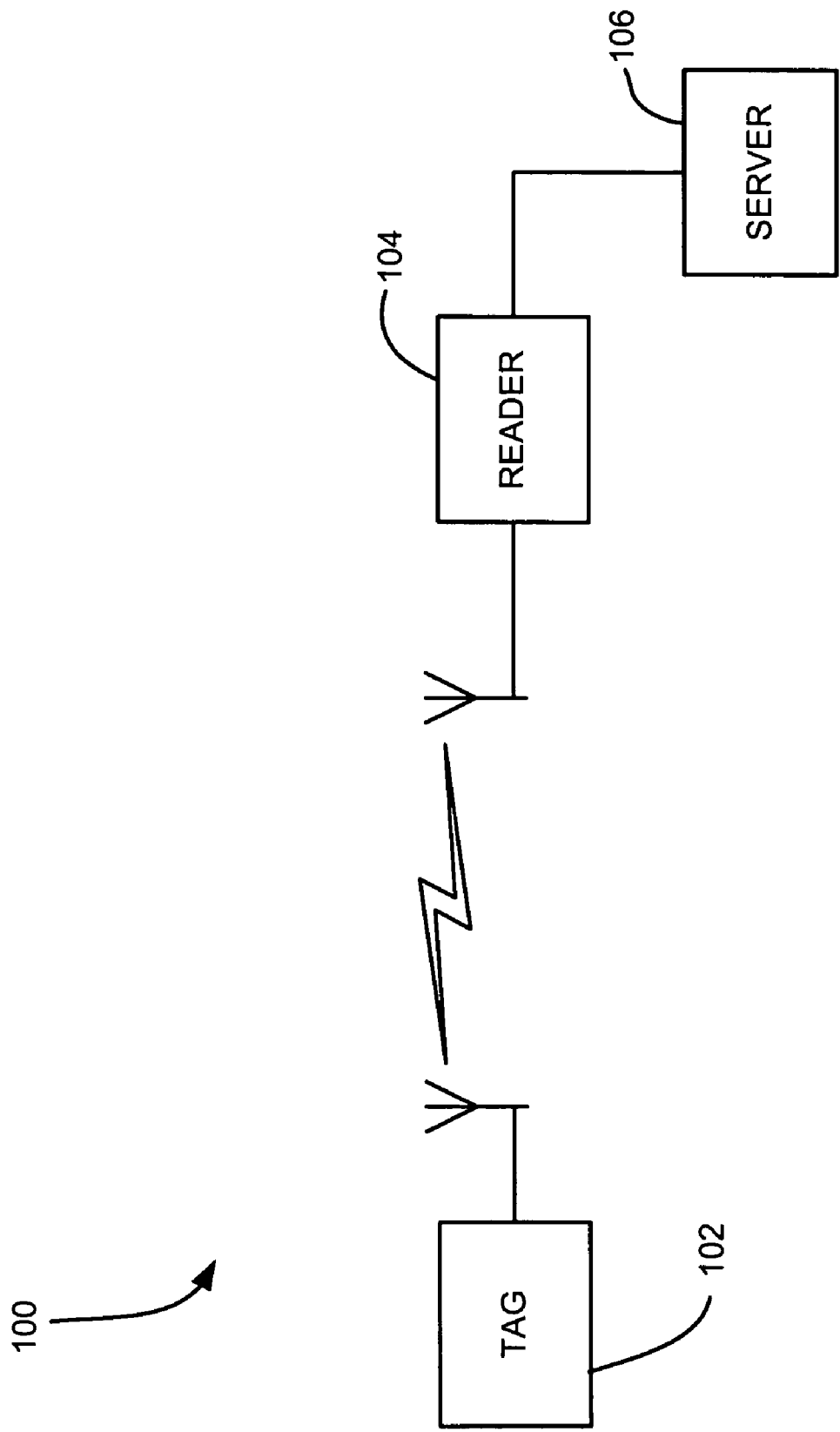
FIG. 1 is a system diagram of an RFID system.

Many types of devices can take advantage of the embodiments disclosed herein, including but not limited to Radio Frequency Identification (RFID) systems and other wireless devices/systems; pacemakers; portable electronic devices; audio devices and other electronic devices; smoke detectors; etc. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software can be downloadable or otherwise transferable from one computing device to another via network, nonvolatile memory device, etc.

Figure 2:
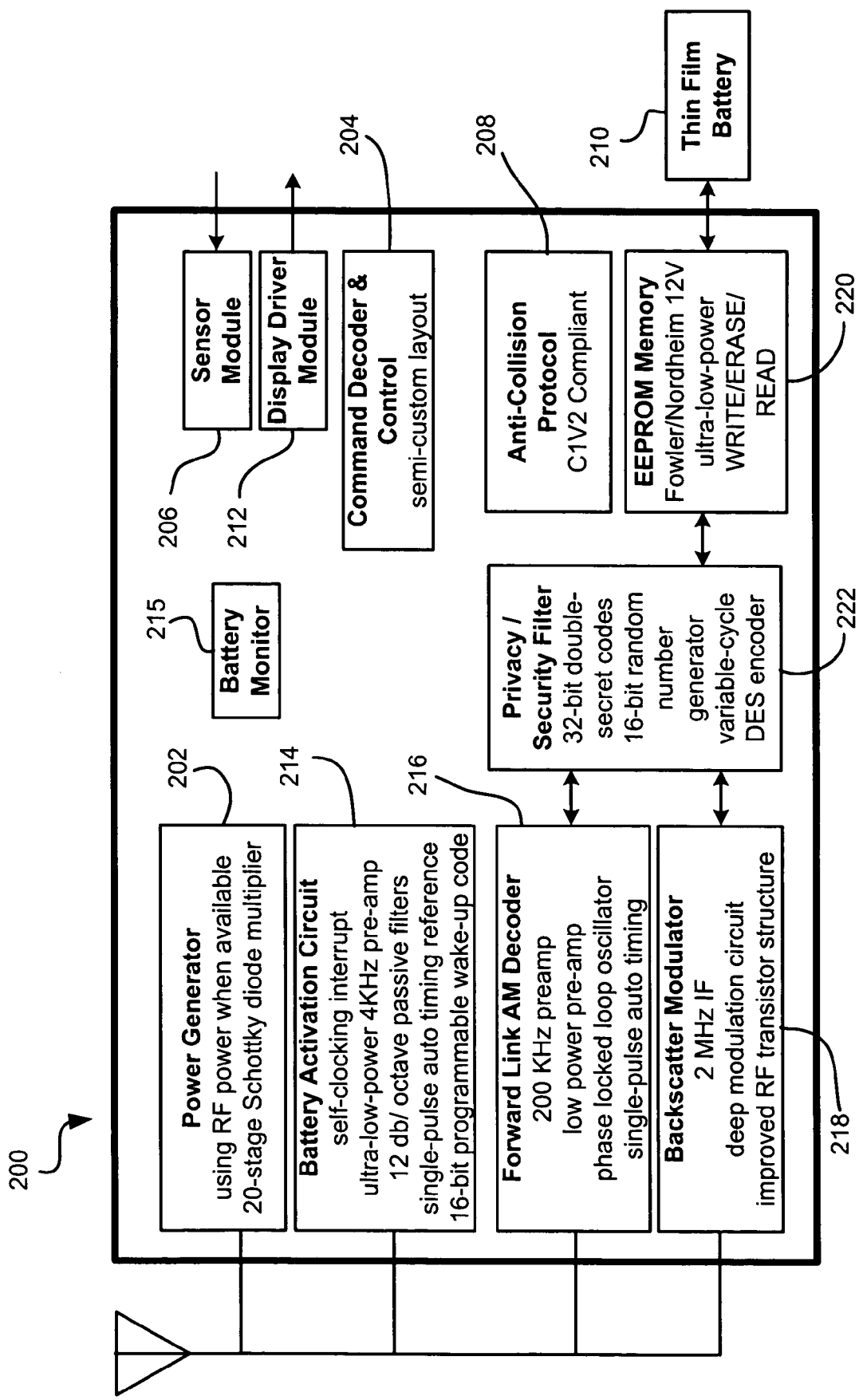
FIG. 2 is a system diagram for an integrated circuit (IC) chip for implementation in an RFID tag.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1V2 interface protocol circuit 208, and a power source (battery) 210. A display driver module 212 can be added to drive a display.

A battery activation circuit 214 is also present to act as a wake-up trigger. This circuit 214 is described in detail below. In brief, the battery activation circuit 214 includes an ultra-low-power, narrow-bandwidth preamplifier with a static current drain of only 50 nA. The battery activation circuit 214 also includes a self-clocking interrupt circuit and uses an innovative 16-bit user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 monitors power usage in the device as described in U.S. patent application entitled "BATTERY MONITOR" to common assignee and having Ser. No. 11/124,487, filed on May 6, 2005 and which is herein incorporated by reference. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A pure, Fowler-Nordheim direct-tunneling-through-oxide mechanism 220 is present to reduce both the WRITE and ERASE currents to less than 0.1 $\mu$A/cell in the EEPROM memory array. Unlike any RFID tags built to date, this will permit designing of tags to operate at maximum range even when WRITE and ERASE operations are being performed.

The module 200 also incorporates a highly-simplified, yet very effective, security encryption circuit 222 as described in U.S. patent application entitled "SECURITY SYSTEM AND METHOD" and having Ser. No. 10/902,683, filed on Jul. 28, 2004 and which is herein incorporated by reference.

Only four connection pads (not shown) are required for the chip 200 to function: Vdd to the battery, ground, plus two antenna leads to support multi-element omni-directional antennas. Sensors to monitor temperature, shock, tampering, etc. can be added by appending an industry-standard I2C interface to the core chip.

Extremely low-cost Class-2 security devices can be built by simply disabling or removing the wake-up module, pre-amplifiers, and/and IF modules from the Class-3 chip core.

The battery activation circuit 214 described herein is used in communication between two devices where a transmitter wants to activate or enable a receiving device via the Radio Frequency (RF) medium. While this circuitry anticipated for use in RFID systems, it is by no means restricted to just that industry. This disclosure describes an activation circuit where the preferred description and embodiment relates to RFID, but is by no means only restricted to that technology. Consequently, any system which requires an entity (e.g., transmitter) to alert another entity (e.g., reader) applies to this idea without regard to the medium used (e.g., RF, IR, cable, etc).

In order to reduce current draw and increase the life of battery resources, the activation of a Class-3 (or higher) device is used. This "activate" command includes a three part "command." The first part is clock synchronization. The second part is an interrupt. The last part is a digital user activate command code. These three parts conceptually create the activate protocol. While it is not necessary to follow this three step process exactly, the steps or method must be sufficiently separated from "other normal" traffic as to be able to decipher the activation command from other commands in either Class-1 or Class-3 devices. The basic features of the "Activate" command are a:

Clock spin-up or synchronization

An interrupt to synchronize the start of a command with sufficient difference from "normal" commands (such as a timing violation in the forward communications protocol)

An activate code to allow potentially selective or all-inclusive activation.

Figure 3A:
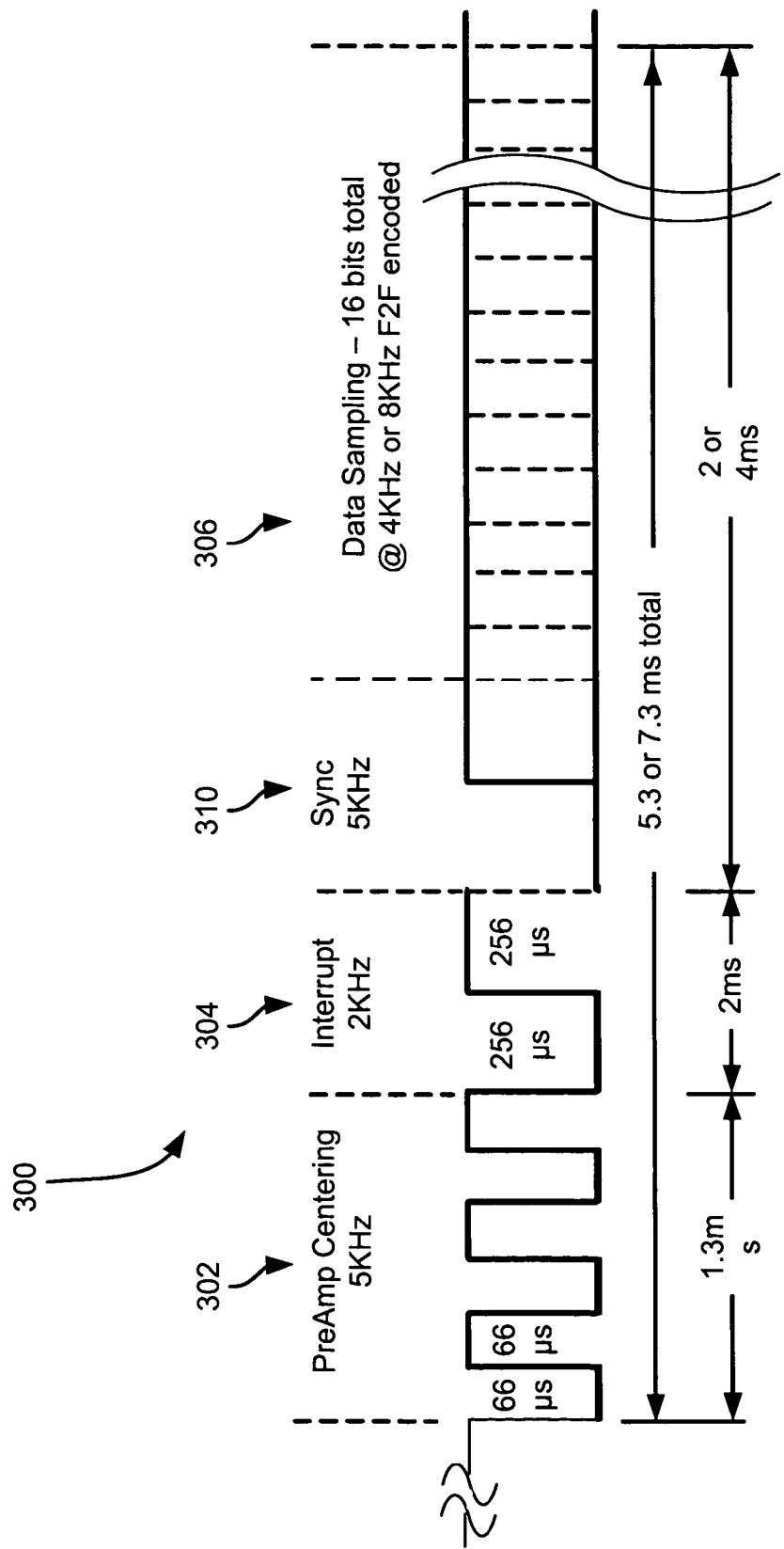
FIG. 3A is a depiction of an activate command according to one embodiment.

FIG. 3A shows one preferred structure of the activate command signal 300. The four sections are shown as: PreAmp Centering 302, Interrupt 304, Synch 305, and Data Sampling 306.

Circuitry and a description of each phase of the command 300 are set forth below in further detail; however, the basic principles are presented now in summary form.

When not in activate mode, or at an initial starting point, all devices will "listen" to incoming signals for the activate command. It is desirable that very little power be consumed in listening for the active sequence. Power consumed is directly related to battery life (and thus potentially device life). As the activate command is received and processed, portions of the circuit activate as more of the activate command sequence is completed.

First a preamplifier centering sequence (PreAmp Centering) 302 is received by the device. This centering preferably includes a number of 6 KHz 50% duty cycle wave forms. Again, the use of a 6 KHz tone is specific to the preferred method and does not represent all possible synchronization methods. This centering is used to interpret all subsequent commands for this period. By sending "some number" of pulses, the receiving device (tag) has sufficient time to adjust its sampling threshold point. This will allow the receiver to distinguish between logical high and low values (ones and zeros).

The next sequence is the interrupt period (Interrupt) 304. This preferably includes one 2 KHz 50% duty cycle wave form. By observing the interrupt period, the receiver (tag) will realize that it received a well formed "Activate" command.

Figure 11:
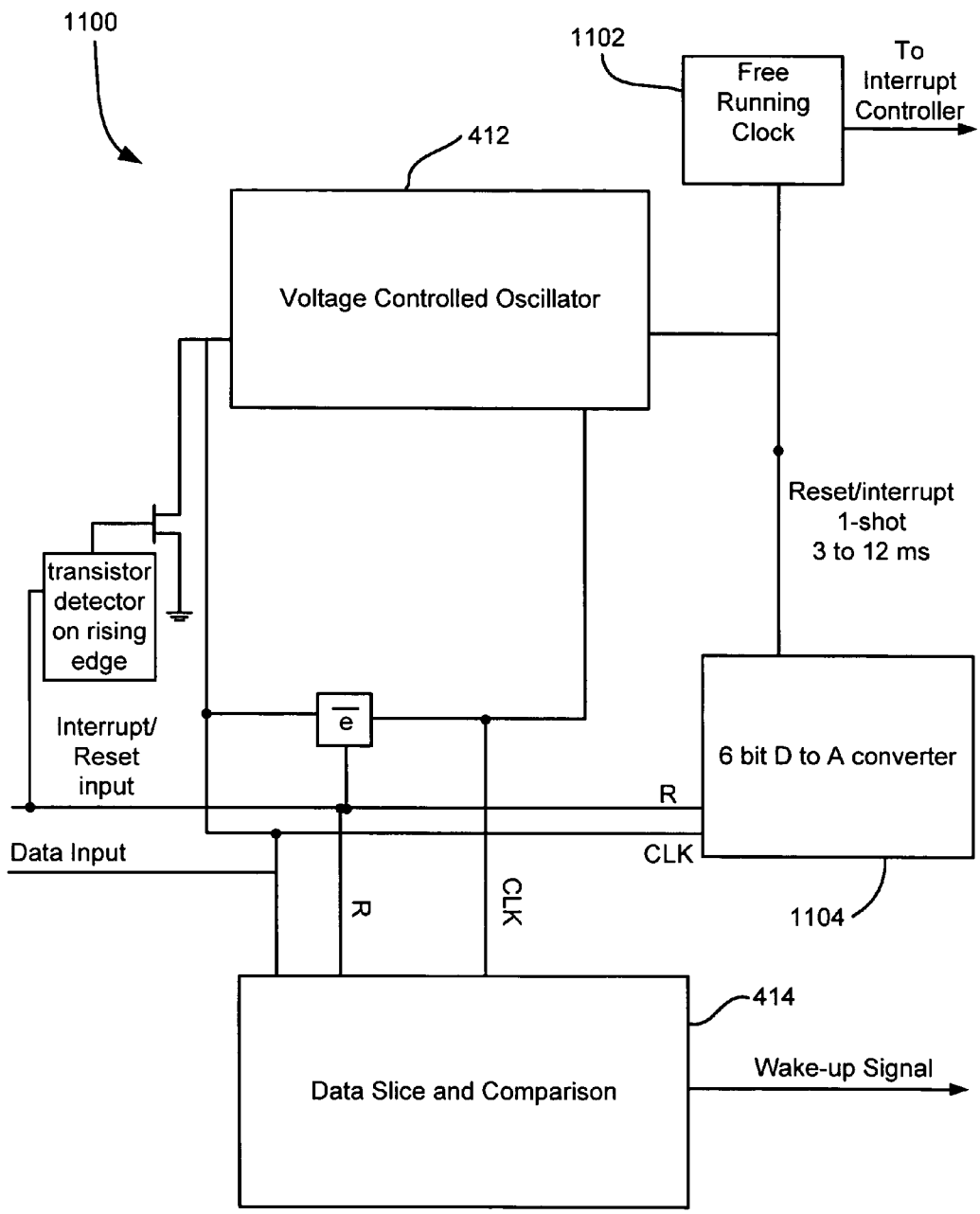
FIG. 11 is a circuit diagram of the voltage controlled oscillator and data slicer of the activate circuit of FIG. 4 according to one embodiment.

The next sequence is a synchronization signal 305, which is used to synchronize an adaptive timing circuit (FIG. 11). Here, the timing circuit is not activated until the device detects the proper interrupt period 304. The timing circuit can then use the synchronization signal 305 to set the period. In this way, the oscillator 412 (FIG. 4) does not need to be constantly running in order to be properly calibrated.

The device should then turn its attention to decoding a subsequent received field, the digital activate code (Data Sampling) 306.

The digital activate code 306 is a 50% duty cycle signal (+/−10%) based on a F2F modulation protocol which will allow the transmitter (reader) to select which populations of receivers (tags) it wishes to activate in a Class-3 mode. The activate code is shown as 16 bits, which allows for $2^{16}=65536$ possible code values. The actual number of possible codes is reduced by one. The 0000(hex) value is used to select all devices regardless of the pre-programmed activate code.

Figure 3B:
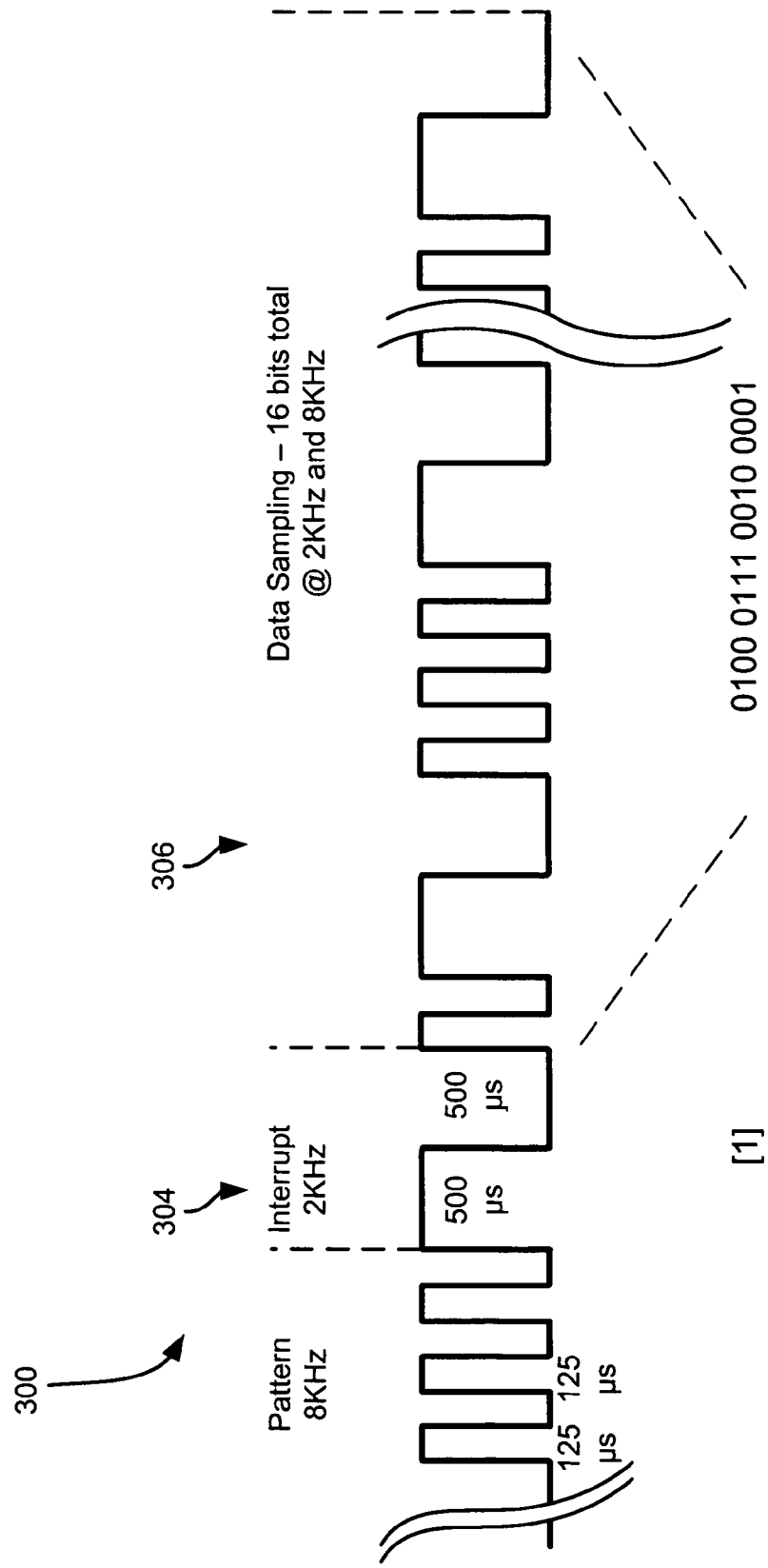
FIG. 3B is a depiction of an activate command according to another embodiment.

FIG. 3B illustrates another preferred structure of an activate command signal 300. However, this waveform is much simpler. For instance, the PreAmp Centering and Sync portions are no longer needed. Note that the PreAmp Centering can be present if desired, denoted as "Pattern" in FIG. 3B. The "Pattern" is preferably a series of all zeros, e.g., 16 zeros.

Instead of sending signals of various symbols (e.g., 2, 4, 5 and 8 KHz as in FIG. 3A), only two symbol signals are used. In this example, the symbols are 2 KHz (logic 1) and 8 KHz (logic 0). The 2 KHz symbol is also used as the interrupt.

Because only two symbols are being used, the circuitry can be much simpler. In fact, no clock synchronization is needed. This also reduces the power requirements. Similarly, operation is more robust, as it is easier to distinguish between two symbols as opposed to four. One tradeoff is that not all possible combinations of 0s and 1s can be used. However, the number of available combinations is more than sufficient for most if not all potential applications.

An additional advantage is that the incoming signal can be asynchronous. In other words, by clocking on the rising edge, the device can read asynchronous studder clocking of data. Because shorter periods (e.g., 8 KHz symbols) can be followed immediately by the next data signal, the overall signal is more time efficient. For instance, four 8 KHz symbols (four 0s) fit within the same time period at one 2 KHz symbol (a single 1). By using four-to-one, no adaptive oscillator is needed, eliminating the need for much of the additional circuitry that would otherwise be required. This also preserves the 50% duty cycle.

In operation, the signal can be sent as a continuous stream. An 8 KHz stream of a repeating pattern (of 0s) or other selected series can be sent to allow the device to center the signal.

The receiving device listens for an interrupt, in this example a logic 1 (shown as [1] in FIG. 3B). Upon encountering any logic 1, the device then sequentially compares the incoming data stream to a stored activate command. If the next sequence of bits matches the activate command, the device wakes up (as described below). If one of the bits in the sequence fails to match, the device resets, looks for the next logic 1, and begins monitoring the sequence of bits after the next logic 1. So for instance, if the third bit is a 1, the device will realize that this is not the correct activate command, will reset, and will begin listening again for the interrupt. In this example, the device will again compare the code received after the sixth bit (the next "1" in the sequence). However, the code will not match and the device will reset again. So while one practicing the invention should be careful to select codes that do not result in unintended activation, occurrence of unintended activation should be rare. Note that codes can be predetermined that avoid unintended activation can be predetermined and assigned. The same would apply to the bits preceding the correct interrupt.

Note that the activate command 300 can be sent several times to ensure that the code tag activates. Also, several different activate commands can be sent consecutively to activate multiple tags.

One skilled in the art will appreciate that the following circuitry will function with a signal as described with reference to FIG. 3A. The following device, when used with a signal as shown in FIG. 3B, does not require certain portions of the device (e.g., VCO [FIG. 11], clocking section [FIG. 12], data slicer [FIG. 13], DAC [FIG. 14]).

Figure 4:
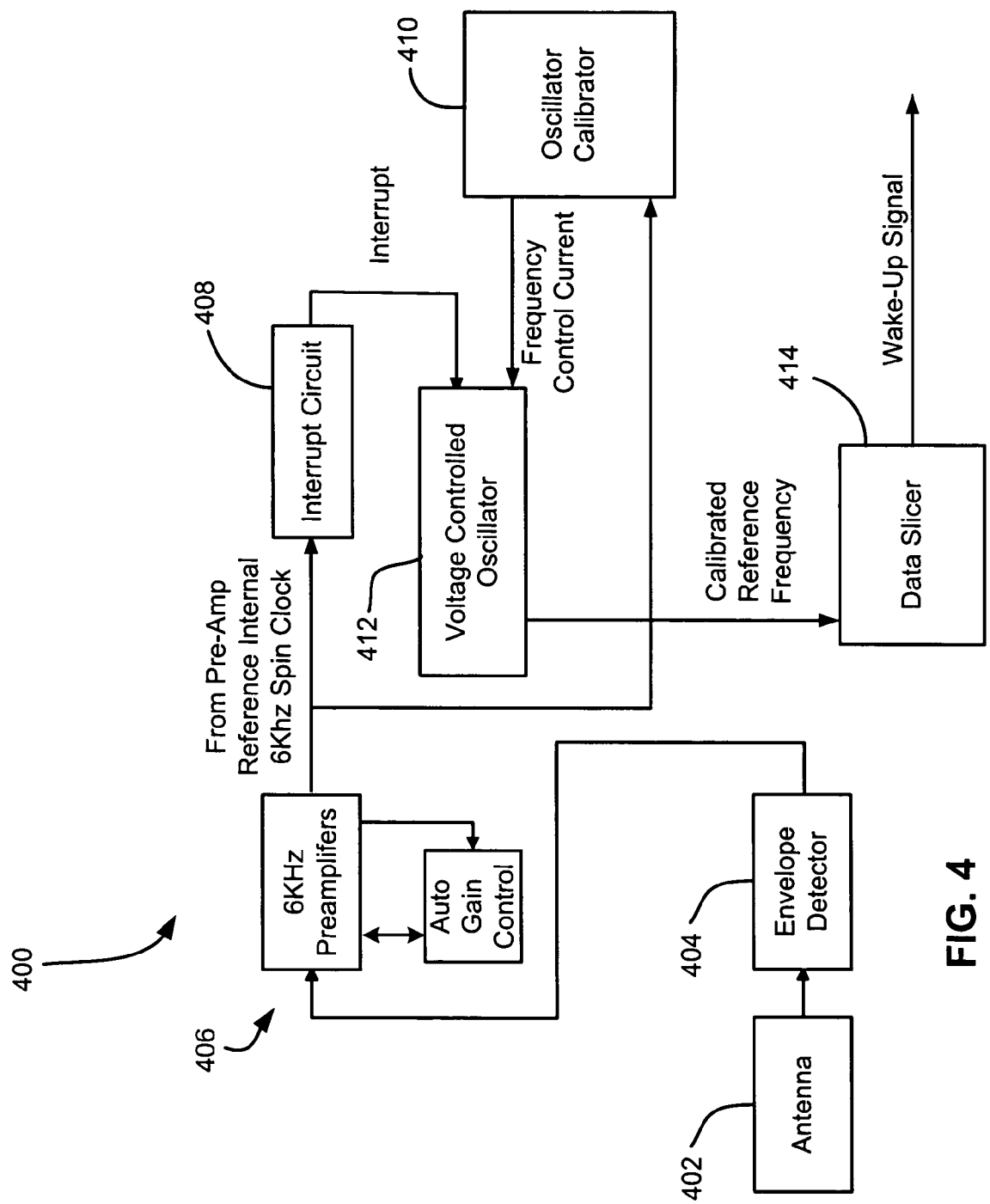
FIG. 4 is a diagram of an activate circuit according to one embodiment.

The block diagram of the system 400 used to implement a preferred method of the activate function is shown in FIG. 4. The system 400 is found on the front end of an RFID tag device. The incoming signal is received by the antenna 402 and passed to an envelope detector 404. The envelope detector 404 provides band pass filtering and amplification. The bias of the amplification stage 406 is also set during the clock tuning phase. The preamplifier and gain control of the amplification stage 406 have a self-biasing circuit (discussed below) that allows the circuit to self-adjust the signal threshold to account for any noise in the signal.

The next several sections deal with collecting this filtered and amplified signal, and trying to match the incoming information to the activate command. In the interrupt circuit 408, observation of incoming information is compared to the interrupt period to match the observed signal to the required interrupt period. If successful, an interrupt signal is sent to the voltage oscillator and data slicer sections, alerting them of an incoming digital activate code. During the spin-up period the oscillator calibrator 410 is used to tune the VCO (voltage controlled oscillator) 412 from a "pre-set" value to the required value needed for this active session. This required value can be stored in a latch and the VCO powered down to conserve power. The data slicer section 414 is used to observe the activate command and compare the received value to the tag's stored value. If the values match, the tag (device) is sent a "wake-up" signal, bring the tag to a fully active state (battery powered).

The subsequent circuitry makes use of "current mirrors." In examining the function of a current mirror, it is used to limit the amount of current draw in an operation or logic function.

Figure 5:
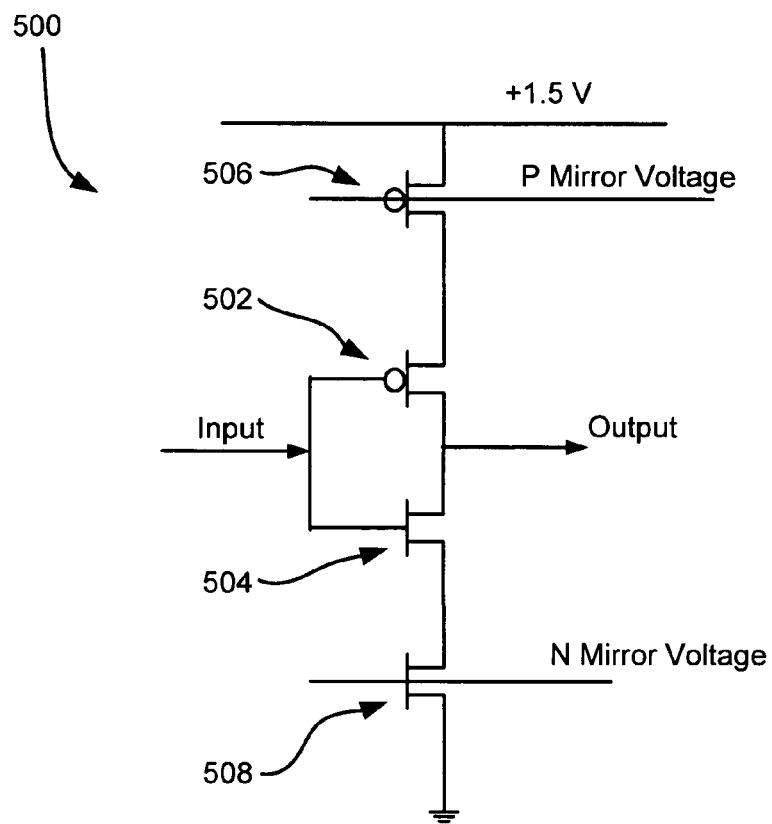
FIG. 5 is a circuit diagram of a mirror inverter according to one embodiment.

FIG. 5 shows a use of the current mirrors 500 to create a low power inverter. A current mirror is a device used in integrated circuits to regulate a current; to keep it constant regardless of loading. The center two transistors 502, 504 comprise a typical inverter. By placing a logical one or high voltage on the input, the bottom transistor 504 is placed into the active region and drives the output signal to a logical 0 or low voltage level. If a low voltage (logical 0) is placed on the input signal, the top transistor 502 will turn on, thus, driving the output signal to high (logic 1). A problem exists when switching from turning on one transistor and turning off the other, in that both transistors are on for a moment, which drive the current to ground. This is a big current drop, and will use large amounts of battery power.

By adding the current mirror principal, two additional transistors 506, 508 are used to limit the amount of current which travels thought the inverter.

Figure 6:
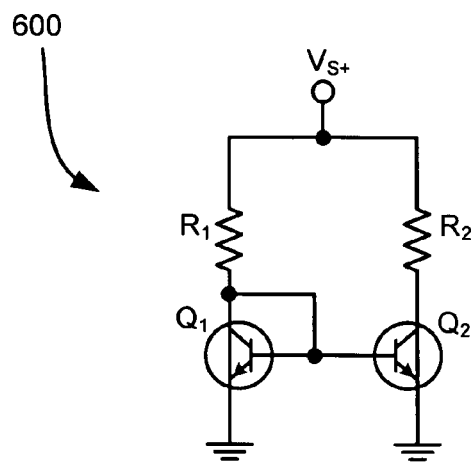
FIG. 6 is a circuit diagram of an exemplary current mirror according to one embodiment.

FIG. 6 illustrates an exemplary current mirror 600 according to one embodiment. From FIG. 6, transistor $Q_1$ is connected such that it has a constant current flowing through it; it actually behaves like a forward-biased diode, and the current is determined by the resistance $R_1$. It is important to have $Q_1$ in the circuit, instead of a regular diode, because the two transistors will be matched, and thus the two branches of the circuit will have similar characteristics. The second transistor $Q_2$ changes its own resistance so that the total resistance in the second branch of the circuit is the same as the total resistance in the first branch, regardless of the load resistor, $R_2$. Since the total resistance in each branch is the same, and they are connected to the same supply, $V_{S+}$, the amount of current in each branch is the same.

The value of $R_1$ can be varied to change the amount of current going through $R_2$. Since $R_2$ can change dynamically, and the current through it will stay the same, the current mirror is not only a current regulator, but also can be thought of as a constant current source, which is the way it is used in integrated circuits.

Figure 7:
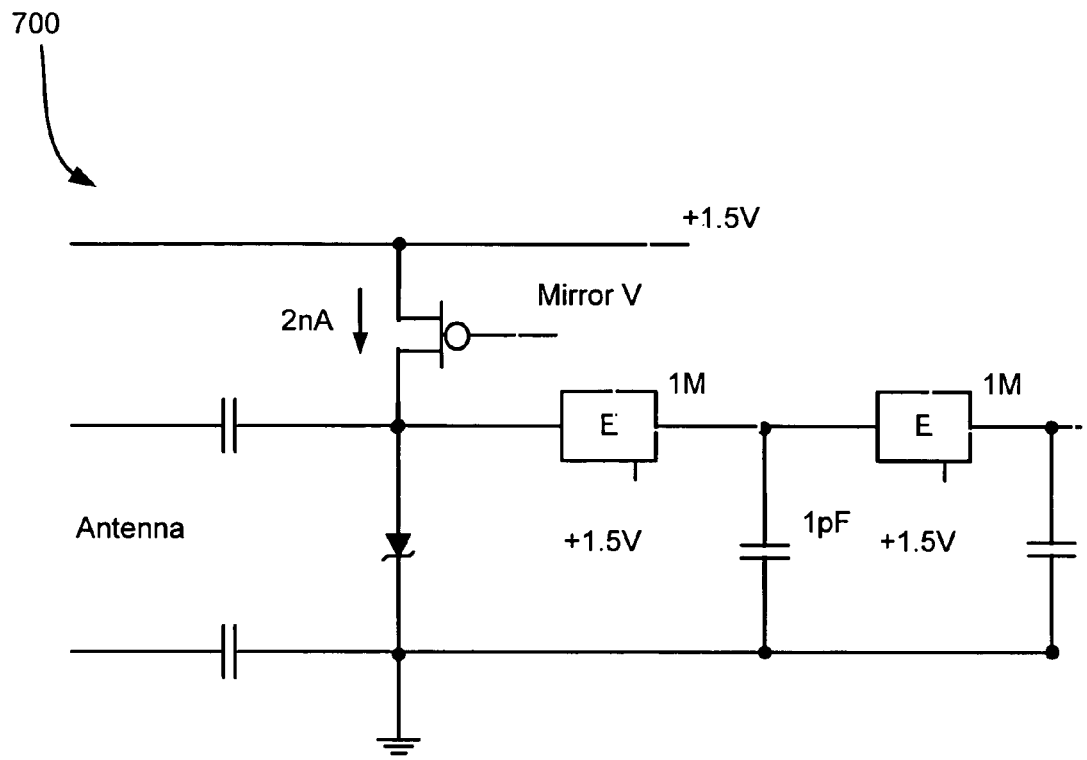
FIG. 7 is a circuit diagram of the antenna and envelope detection sections of the activate circuit of FIG. 4 according to one embodiment.

The first piece of the protocol is the antenna and envelope detection sections 402, 404. This circuit 700 is shown in FIG. 7.

Figure 8:
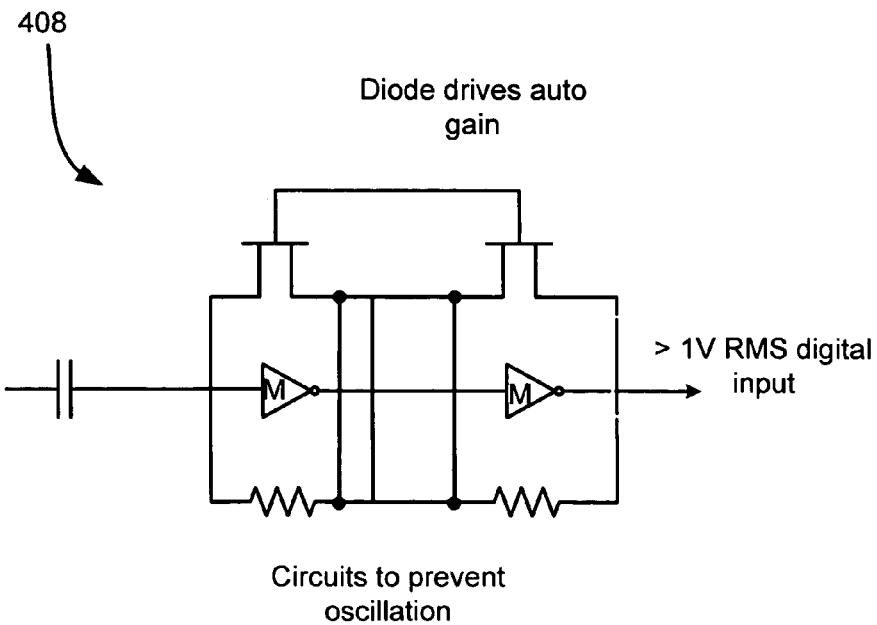
FIG. 8 is a circuit diagram of the self-biasing pre-amplifier of the activate circuit of FIG. 4 according to one embodiment.

There are several parts to this circuit 700. Two items of interest come from the antenna 402: the first is the signal where the information exists and second is the RF radiated power. Radiated power is dealt with separately. The information (signal) is then filtered by a low pass filter. From this section the signal is sent to the amplification and self biasing circuit 406 shown in FIG. 8.

Figure 9:
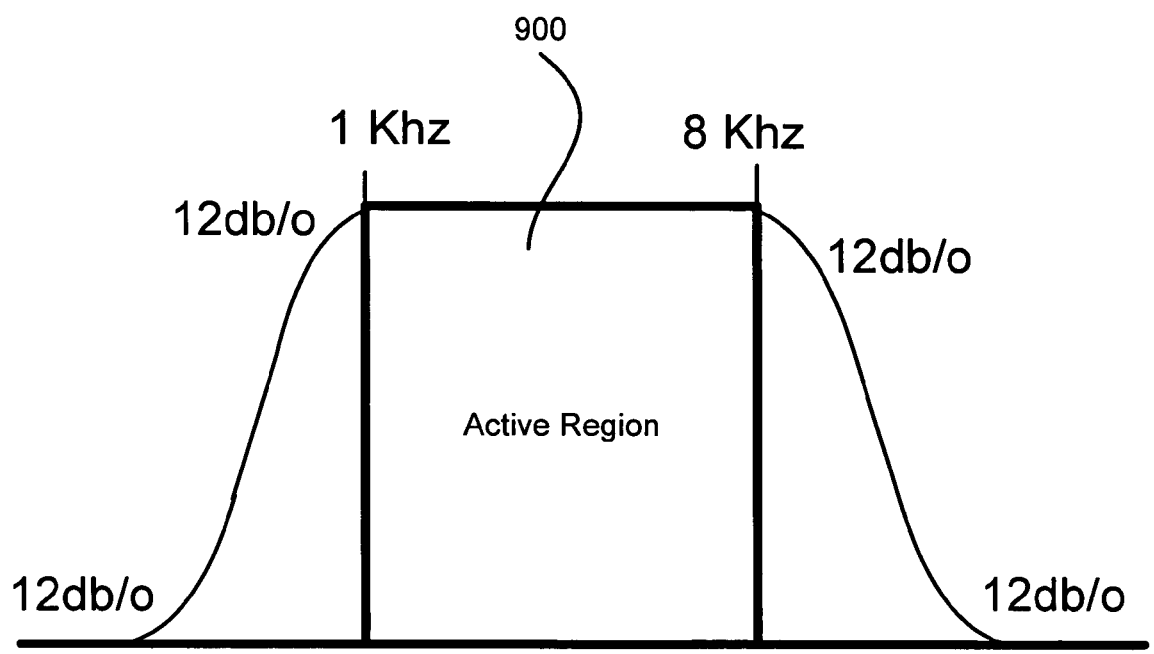
FIG. 9 illustrates a band pass region of a signal filtered by high and low pass filters of the activate circuit.

The first portion of this circuit 406 is a high pass filter. This in conjunction with the previous stage low pass filter creates a band pass filter. Shown in FIG. 9, this band pass region 900 is approximately 7 KHz with a 12 db/octivate drop off on either side. This band pass filter is used to exclude most of the unwanted noise.

The merits of this two stage amplifier allow for a tuning and self biasing of the output signal. A signal will enter from the left hand side of FIG. 8 and be filtered by the capacitor resistor (RC) circuit. This allows filtering of unwanted signals (high pass). The signal then goes into the op-amp design, which due to the feedback configuration will allow for self biasing. The noise associated with background may cause the bias point to move from an optimal position to a point far out of range. Because the signal is a 50% duty cycle waveform (50% high and 50% low), the threshold will move towards the average value, centering itself at the desired bias point. If noise is received, the resistor bleeds off some of the signal. By forcing the duty cycle to 50%, the DC level will always seek a midpoint between two signals, causing it to center itself on the received signal, regardless of the amount of noise or strength of the signal. And though unwanted noise may indeed fall into the range allowed by the band pass filter, noise will not exhibit the characteristics of a 50% duty cycle wave form. If the waveform is not 50%, the bias point will eventually move towards the appropriate level.

If a noise signal is received such that the amplifier receives a very unbalanced high voltage non-50% duty cycle, the bias point will move to a higher input voltage (the equivalent argument exists for the opposite condition and a lower input voltage). In this case where a "real" signal which exhibits a 50% duty cycle within the band pass filter range is presented to the input of the pre-amp, it may have a different voltage threshold. By allowing several cycles to occur, the 50% duty cycle will adjust the bias point, dropping or raising the voltage level to accommodate the "real" signal as opposed to the "noise" signal (background, interference, or otherwise). The output of the pre-amp should be a 1V root means square (RMS) digital "input" to the next sections. These two sections are the interrupt circuit and the activation code circuit.

At this point, the circuit has helped tune the clock, and the threshold has been set. Now, the interrupt needs to be identified. The interrupt has a specified low period and a specified high period. If the low and high periods fall within a prespecified range, the circuit knows to look for the activate code.

Figure 10:
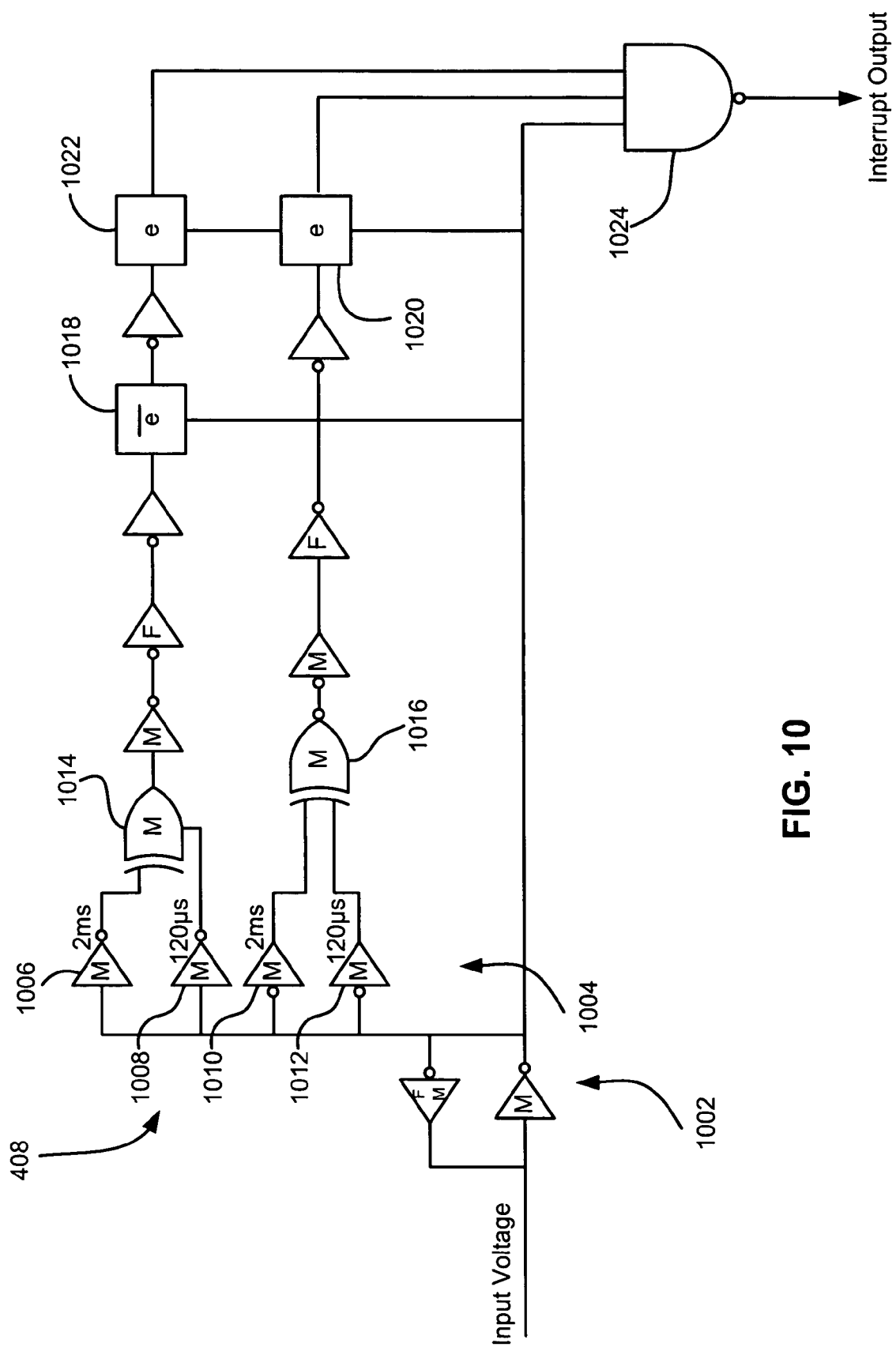
FIG. 10 is a circuit diagram of the interrupt circuit of the activate circuit of FIG. 4 according to one embodiment.

The interrupt circuit 408 is shown in FIG. 10. The output of the pre-amplifier 406 comes into the left hand side of the interrupt circuit 408 shown in FIG. 10 as the digital input voltage. It is then passed through a weak feedback latch 1002 which will hold the digital value until the input changes. The next section (of mirror invertors) 1004 matches the low and high period times associated with the interrupt period. This interrupt period corresponds to the second section of the activate command preamble.

Each of the parallel equivalent sections contains two inverters 1006, 1008, 1010, 1012 which limit by delay the period of the high and low period of the interrupt interval. The upper half of the circuit captures or matches the low period of the interrupt pulse, and the lower half captures the high period of the pulse. Both portions of the diagram show a 120 μs and a 2 ms bounds to the signal. This occurs via the matched mirrored inverters 1006, 1008, 1010, 1012. Each of these inverters 1006, 1008, 1010, 1012 contains a current mirror to limit current drain. Each of these inverters 1006, 1008, 1010, 1012 is "tuned" for specific delay timing. One inverter (in each half of the circuit) is tuned for 120 μs and the other is tuned for 2 ms. This allows matching of delays between these intervals. The interrupt interval is nominally set for 256 μs, which is a period timing between 2 ms and 120 μs; that being a pulse interval of 256 μs with a tolerance of −135 μs to +1.74 ms.

The mirror inverters 1006, 1008, 1010, 1012 are similar to that shown in FIG. 5. However, to achieve the desired long delay timing (e.g., 2 ms), several unique features are provided. The channel width of the P-side transistor (502 of FIG. 5) is reduced to minimum (e.g. 0.6 μm). The channel length of the P-side transistor is extended (e.g., 20 μm) to further reduce the current passing therethrough. The current is slowed even more because the long channel length increases the threshold, making it harder to turn the transistor on. Additionally, the transistor is more capacitive due to its size, slowing the signal even further. To further extend the timing delay, mirror transistors (506 and 508 of FIG. 5) are added, which are driven by mirror voltages. The mirror transistors are also asymmetrical, the P-side mirror transistor having channel dimensions similar to the P-side transistor. However, the P-side mirror transistor is set to be only 10 s of mV above the threshold. Note that the N-side mirror transistor (508 of FIG. 5) is optional, as the N-side transistor (504 of FIG. 5) is a full-size device and so switches quickly.

Because the mirror inverters work as timing circuits, they have a very large capacitance, and the signal consequently is in the fault zone for a long time, i.e., ramps very slowly. To sharpen the edges of the now bounded or filtered signal, the output of each inverter 1006, 1008 on the top half goes into an exclusive OR (XOR) gate 1014 and then passes through several stages of inverters to arrive at a pass gate 1018. Each "stage" sharpens the edge of the signal a little more, amplifying and cleaning up the signal to provide a signal with a rapid transition time. Note that an M indicates a mirror inverter, while an F indicates a fast mirror inverter.

The same process is true for the high period on the lower half of the figure. The high period bound then passes again though an XOR gate 1016 through several inverters and arrives at a pass gate 1020. Both the upper and lower pass gates 1018, 1020 are used as latches. The one difference is that the upper path has an additional pass gate 1022, to allow for a shift register approach to synchronize timing and order. Since the low time precedes the high time by half a clock period, the low valid signal must be held for this additional time to align with the high period valid signal. The exclusive OR gates 1014, 1016 are used to select the active potion of the interrupt protocol. Since the timing of valid periods falls within the 120 μs to 2 ms period, the outputs of the mirrored inverters 1006, 1008 will activate the output of the XOR gate 1014, driving it true. This signal in turn is captured with the correct polarity by the pass gate 1018 used as a latch for synchronization. If the sequence of the interrupt protocol is "valid", then the output of the logic (e.g., NAND) gate 1024 will go low, thus, signaling that an Interrupt output has occurred. The logic gate 1024 has five inputs: the four outputs from the mirrored inverters 1006, 1008, 1010, 1012 and the output from the feedback latch 1002.

This Interrupt output signal is then passed to the final block 1100 shown in FIG. 11, which is the second half of the activate circuit 400 shown in FIG. 4. This section includes four separate blocks; a free running clock 1102, a voltage controlled clock 412, the data slice and comparison block 414, and a 6 bit digital to analog converter 1104.

Figure 12:
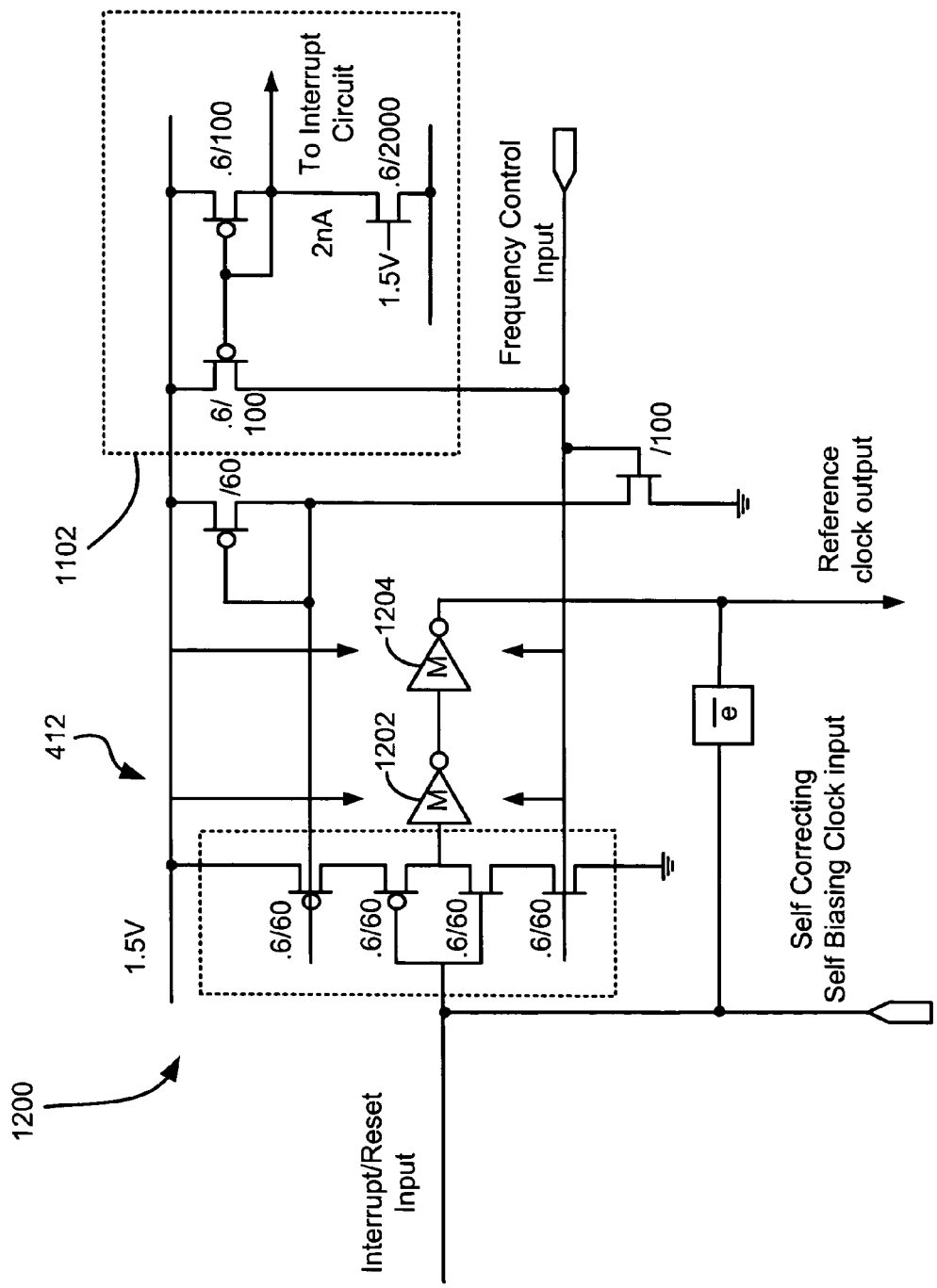
FIG. 12 is a circuit diagram of the clocking section of FIG. 11 according to one embodiment.

A diagram of the clocking circuits 1200 is shown in FIG. 12. FIG. 12 is divided into two portions: first the voltage controlled clock 412 and second, the free running clock 1102. It consists of three transistors which are combined to provide an oscillator configuration. Due to the nature of the configuration, it will provide a free oscillating reference which is sent to the interrupt circuit. The second half of FIG. 12 deals with the voltage controlled clock 412. There are three basic inputs to the circuit; first is the reference voltage, second is the reset and last a self correcting self biasing clock input which is used in conjunction with the input data to align clock edges to the incoming signal.

The Frequency control input comes from the digital to analog converter 1104 and is used to adjust the voltage controlled clock section 412. By raising or lowering the voltage associated with this signal, the oscillator speed is varied. This adjustment affects the mirror inverters 1202, 1204 to speed up or slow down the oscillating speed. This output is then used as the reference for the data slice section. Because it is also desired to adjust the clock period to correctly align to the incoming data signal, a self correcting, self biasing input is also used to adjust the clock edge. If logic 0 is placed on this input, it turns on the upper transistor and turns off the lower transistor (inputs to the mirrored invertors). This will then place logic 1 on the clock reference output. Consequently, the opposite it also true; logic 1 placed on this input will turn off the upper transistor and turn on the lower transistor. This will assert logic 0 on the clock reference output. The last input is the Interrupt input, which is used to reset the clock circuit, stopping the oscillator and thereby conserving power. In much the same way as a logic 1 is used from the self correcting self biasing input, the same is true of the interrupt/reset input. An advantage of this configuration is that the oscillator need only run during the calibration interval.

Finally, a pass gate is used to regulate the interrupt/reset value (not shown due to clarity). The function of this pass gate is to select from the self correcting input or the voltage controlled clock input, the output of this gate goes to the data slice section as the selected clock.

Figure 13:
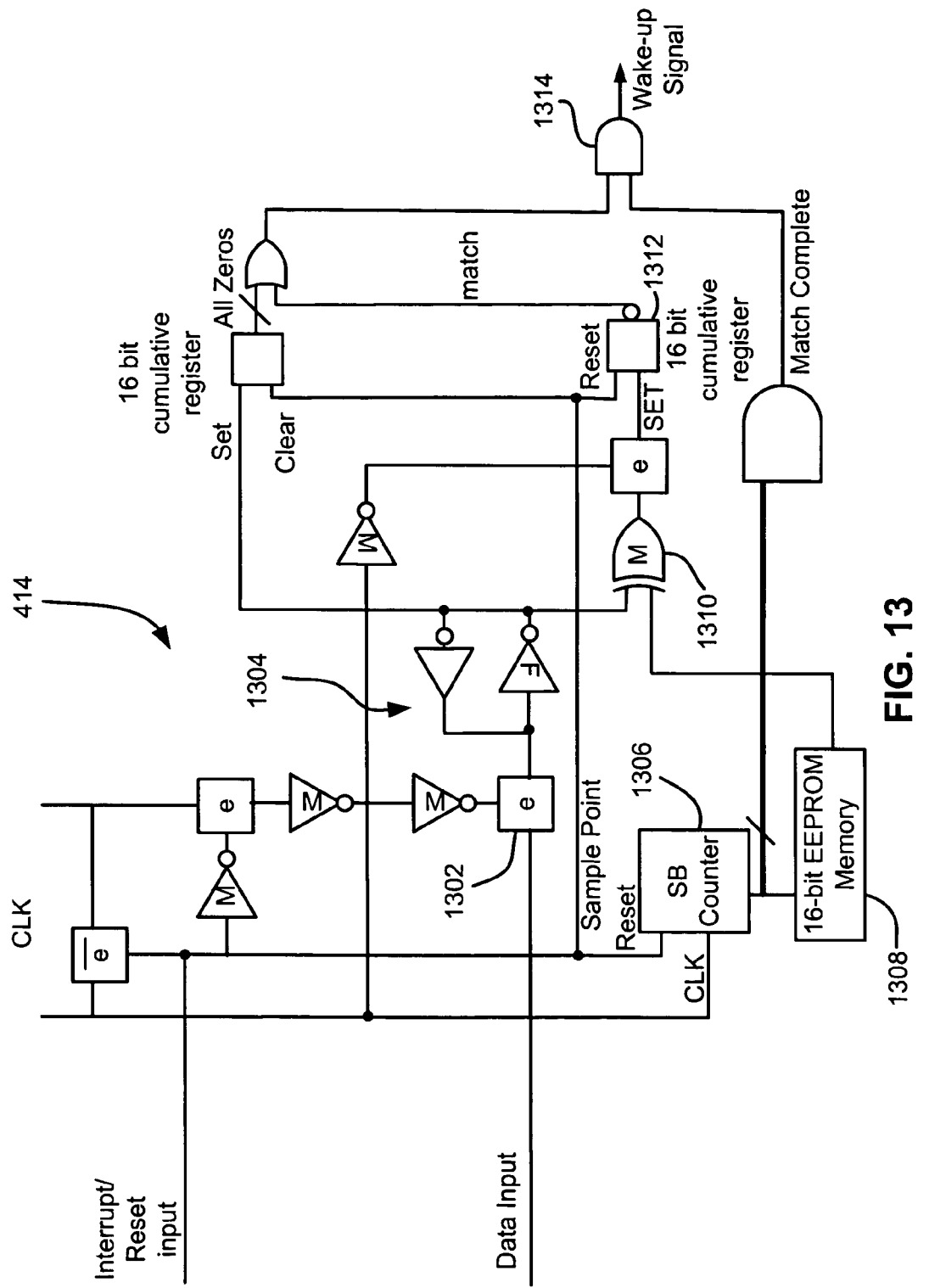
FIG. 13 is a circuit diagram of the data slice section of FIG. 11 according to one embodiment.

FIG. 13 illustrates the adaptive data slice section 414. This section 414 decodes the incoming data stream and determines if the incoming F2F data encoding matches the internal preprogrammed activation code value. Data input comes from the amplification and band pass filter stage block 406 and runs to the pass gate 1302. From the pass gate 1302 which is clocked from the voltage controlled oscillator, the data value is held in a weak feedback latch 1304. At each transition of the data input in conjunction with clock edges a counter 1306 is clocked. This counter 1306 is used to address the 16 bit EEPROM 1308. The counter 1306 is reset from the reception of the interrupt portion of the protocol. After the interrupt, the counter 1306 starts addressing subsequent EEPROM locations. These EEPROM locations hold this device's "Activate code." At each clock interval, a comparison is done between the incoming data input value and the stored value of the activate code. If there is a miss-match, the exclusive OR gate 1310 will set one segment of the 16 bit cumulative register 1312. This will in turn keep the wake-up signal from asserting. If there is no mis-match, the 16 bit cumulative register 1312 has no segments set, and will assert its matched signal. This is then further qualified by the counter reaching its end, of all ones. This value is detected and when it occurs, will assert the match complete signal. The match complete signal qualifies the output of the match or all zeros OR gate 1314. If the OR gate 1314 is asserted, then the output of the wake-up will also be asserted. Two values may cause a wake-up; a match of the stored activate code or a special code, e.g., all zeros. The all zeros value is used to attempt match activate codes from any reader. For instance, the all zeros value can instruct the tag to respond to all readers, thereby providing interoperability of the tags in various environments.

Note that the special activate code can be some sequence of values other than all zeros, such as all ones, or a second sequence of ones and zeros. Additional logic and/or memory may be required to identify and/or match these other values.

Figure 14:
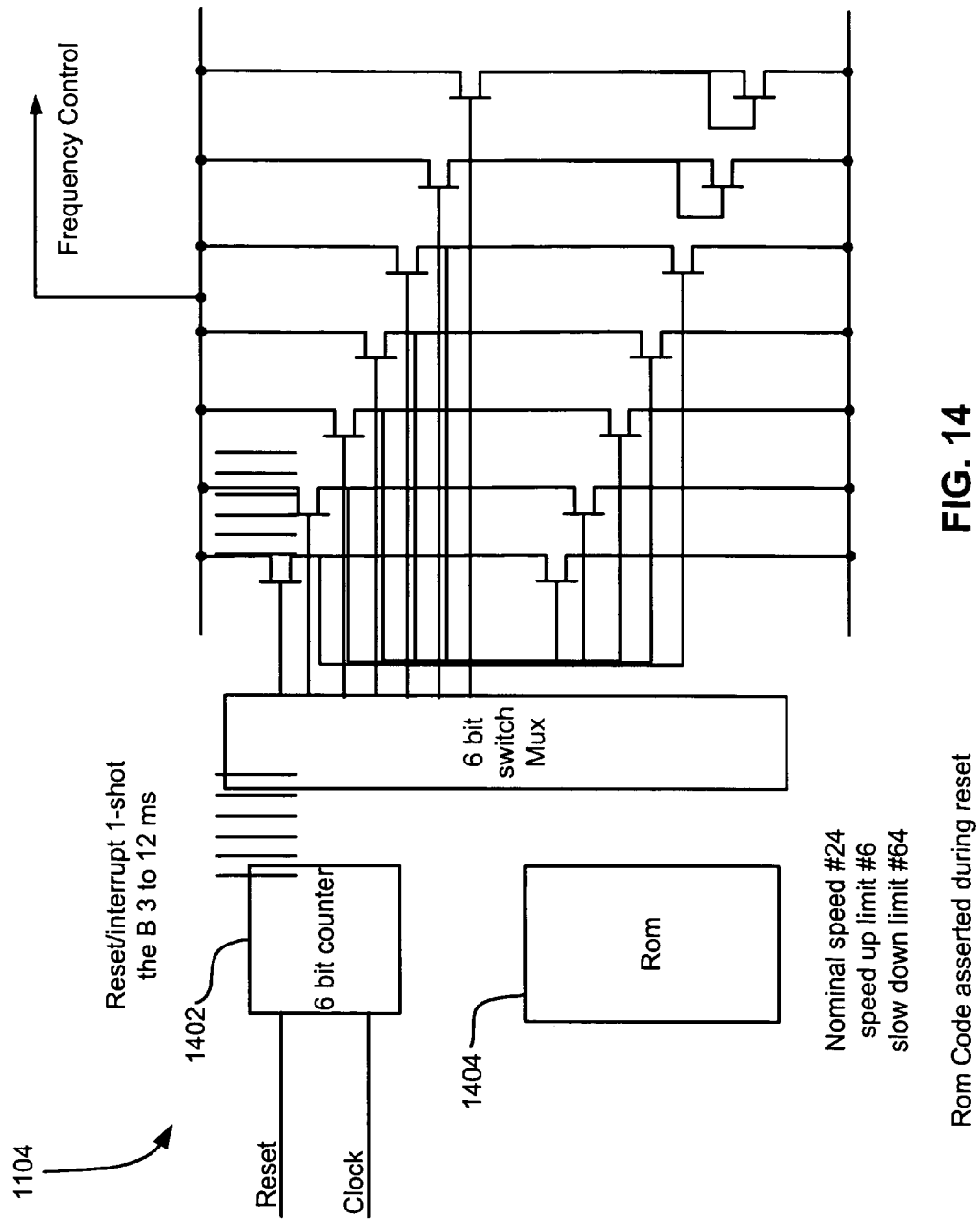
FIG. 14 is a circuit diagram of the digital to analog converter of FIG. 11 according to one embodiment.

The final section is the digital to analog converter 1104 shown in FIG. 14. The basic operation of this section 1104 is to optimize the voltage controlled clock 412. This is accomplished by initial starting operation of the VCO 412 using a fixed "tuned" value stored in the ROM 1402. The value is nominally set to a value of 24 which will select the chosen weighted or sized transistors to provide a fixed voltage to the VCO 412. By adjusting the active transistors, the voltage output is modified, either up or down. This modification is accomplished by the 6 bit counter 1404. During active tuning periods the speed of the VCO 412 is increased or decreased by turning on or turning off different combinations of the transistors.

The clock to the counter is from the VCO 412 and the reset to the counter comes from the op amp outputs in the filtering and amplification stage 406. The tuning occurs during the initial phase of the activate command. From FIG. 3, we find that the first portion of the active command is a 6 KHz tuning period. It is this tuning period which is used to adjust the value used in the counter 1404, and thus, the value and number of transistors which have been turned on. This in turn will adjust the value of the "frequency control" signal.

Figure 15A:
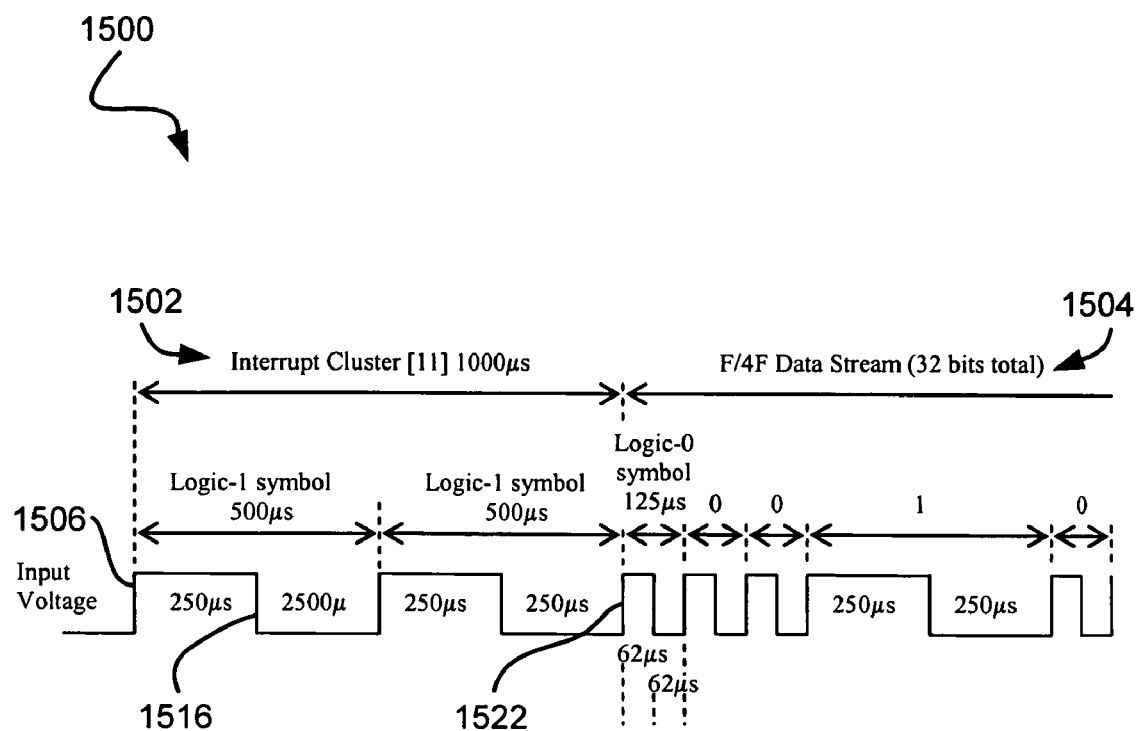
FIG. 15A is a depiction of an activate command according to an embodiment.
Figure 15B:
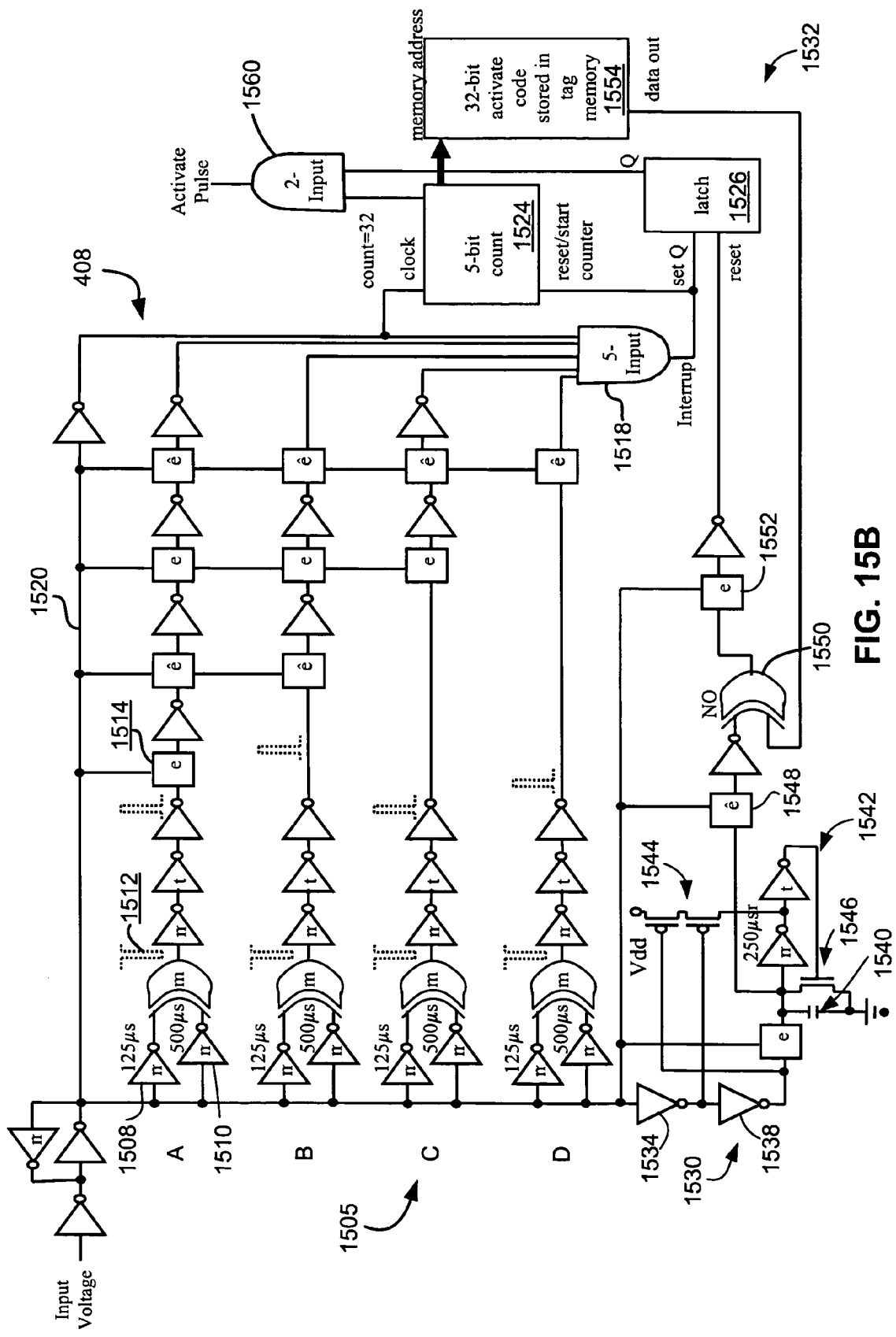
FIG. 15B is a circuit diagram of the interrupt circuit of the activate circuit of FIG. 4 according to one embodiment.

FIGS. 15A-B depict a preferred embodiment of the interrupt circuit 408 and an illustrative interrupt command signal 1500. This interrupt circuit 408 detects an activate command signal 1500 similar to that shown in FIG. 3B. However, in this circuit 408, four (or more) data paths are present to detect an "interrupt cluster" 1502 in the incoming signal, where the interrupt cluster is a series of symbols that the circuit recognizes as an interrupt. Here, the interrupt cluster is a data 1-1. Again, upon detecting the proper interrupt cluster, the circuit will then compare the subsequently received activate command 1504 and compare it to a value stored in the device.

Regarding the activate command signal 1500 shown in FIG. 10B, it is preferred that the activate command portion 1504 of the signal 1500 not contain any sequence of two consecutive 1's. In a 16 bit code 1504, about 1 million combinations are possible. In a 32 bit code 1504, there are about 4 billion possible combinations.

The first part of the circuit is an interval detection circuit 1505 that detects the interrupt cluster. Data path A detects the first rising edge 1506 of the interrupt cluster. The "r" following the delay times (250 µs and 1 ms) denotes that the mirror inverters 1508, 1510 respond to the rising edge 1506.

The first mirror inverter 1508 responds to the first rising edge slowly, e.g., in 256 µs. The second inverter takes even longer to respond, e.g., 1 ms. The two acting together create a negative pulse 1512 (due to the inverter) in response to the positive clock edge 1506. The pulse goes low and lasts 250 us to 1 ms. The information, once initially sampled, is clocked like a shift register through the remaining logic. In this embodiment, the data passes through several logic a latch, e.g., first enabling gate 1514 drops at 500 µs to capture a logic 1. The signal then passes through additional latches, inverters, and registers to finally arrive at a logic AND gate. The other latches in data path A respond similarly to the first latch 1514, except that those with "ê" capture data on the falling edge.

Data path B functions in substantially the same way as data path A, with the exception that the mirror inverters respond to the first falling edge 1516, as denoted by the "f" following the delay time. Another difference is that data path B has fewer logic elements, as the edge 1516 it responds to is later in time.

The same is true for data paths C and D. The net result is that the signal from each data path arrives at the interrupt gate 1518 (AND gate) at the same time.

If the interrupt cluster is proper, all of the inputs into the interrupt gate 1518 are 1's, including the input along line 1520 (as resulting from rising edge 1522). When all 1's are input into the interrupt gate 1518, the interrupt gate 1518 outputs a pulse that starts a 5-bit counter 1524 and sets a latch 1526.

The circuit 408 now knows to look for a 32 bit activate code 1504 using a period detector circuit 1530 that resets the timing on the rising edge of the clock, and a comparison circuit 1532 that compares the activate command to a prestored value.

The period detector circuit 1530 is only concerned with the length of the symbol (e.g., rising edge to rising edge or falling edge to falling edge). Accordingly, having the proper duty cycle is less important. As the incoming signal goes low to high at the rising edge, it passes through a first inverter 1534 and a second inverter 1538, as well as opens a first and third latch 1536, 1552. The signal passes through the first latch 1536 and is stored in a capacitor 1540. The signal then enters a delay circuit 1542 coupled to a P device 1544. The delay circuit 1542 outputs a pulse after a predetermined time, e.g., 250 µs, which activates transistor 1546 and allows the data stored in capacitor 1540 to go to a second latch 1548. The second latch 1548 opens on the falling edge, allowing the signal to reach the NOR gate 1550, where it is compared to the stored activate command.

Turning now to the comparison circuit, the counter 1524 starts when an interrupt signal is received from the AND gate 1518. A memory 1554 stores a predetermined activate code. The code is fed from the memory 1554 to the NOR gate 1550 under control of the counter 1524. Because the counter 1524 and the third latch 1552 are on the same clock signal, the NOR gate is able to compare the stored code sequence to the incoming data sequence with the correct timing. If the incoming code matches the stored code, a second AND gate 1560 outputs an activate pulse which instructs the tag to wake up.

Again, as mentioned above, the circuit can also know to activate if the interrupt matches and the subsequent activate command is 0's.

As mentioned above, in some cases, the tag may have to detect multiple codes, such as a public activate codes, private activate codes, codes for specific classes of tags or items, and codes specific to the tag. For instance a hierarchical structure can also be used, where one code activates all tags in a warehouse, another code activates the cleaning supply tags, and a third code is specific to each tag. One skilled in the art will appreciate the many options that are available to the designer and user when multiple codes can be used.

To enable multiple codes, portions of the activate command comparison portion 1532 of the circuit can be replicated (with the other code(s) stored in the memory), as will be understood by one skilled in the art.

It should also be noted that the circuit 408 is self clocking. Line 1520 provides a clocking signal to the counter 1524, which uses the input voltage as the clocking signal.

Thus, both circuits 408 shown in FIGS. 10 and 15 are self clocking circuits (as no clock is present). Accordingly, two methods have been shown how to detect an interrupt without requiring a clock signal be present. One skilled in the art will understand that other circuit designs can be used to implement the various embodiments.

In the following embodiments, the term "activate command" can be an activate command as described above, can merely be an activate code, or any command which includes an activate code. Also note that the following embodiments can also be implemented using other commands with a digital code, and should not necessarily be limited to activate codes.

Accordingly, the same circuit(s) that receive and process the activate code can also be used to tailor tag operation upon wakeup. The circuits would then provide an appropriate signal or instruction based on the particular activate code received. One skilled in the art will also appreciate that other types of circuits can also be used.

A 32 bit activate code allows about 4 billion different codes, so the number of activate codes that can be implemented in a given system is virtually unlimited. Accordingly, multiple variants of the activation code can be generated and used, not just to wake up the tag, but also to help singulate and control the initial state of the tag. Several examples follow.

Figure 16:
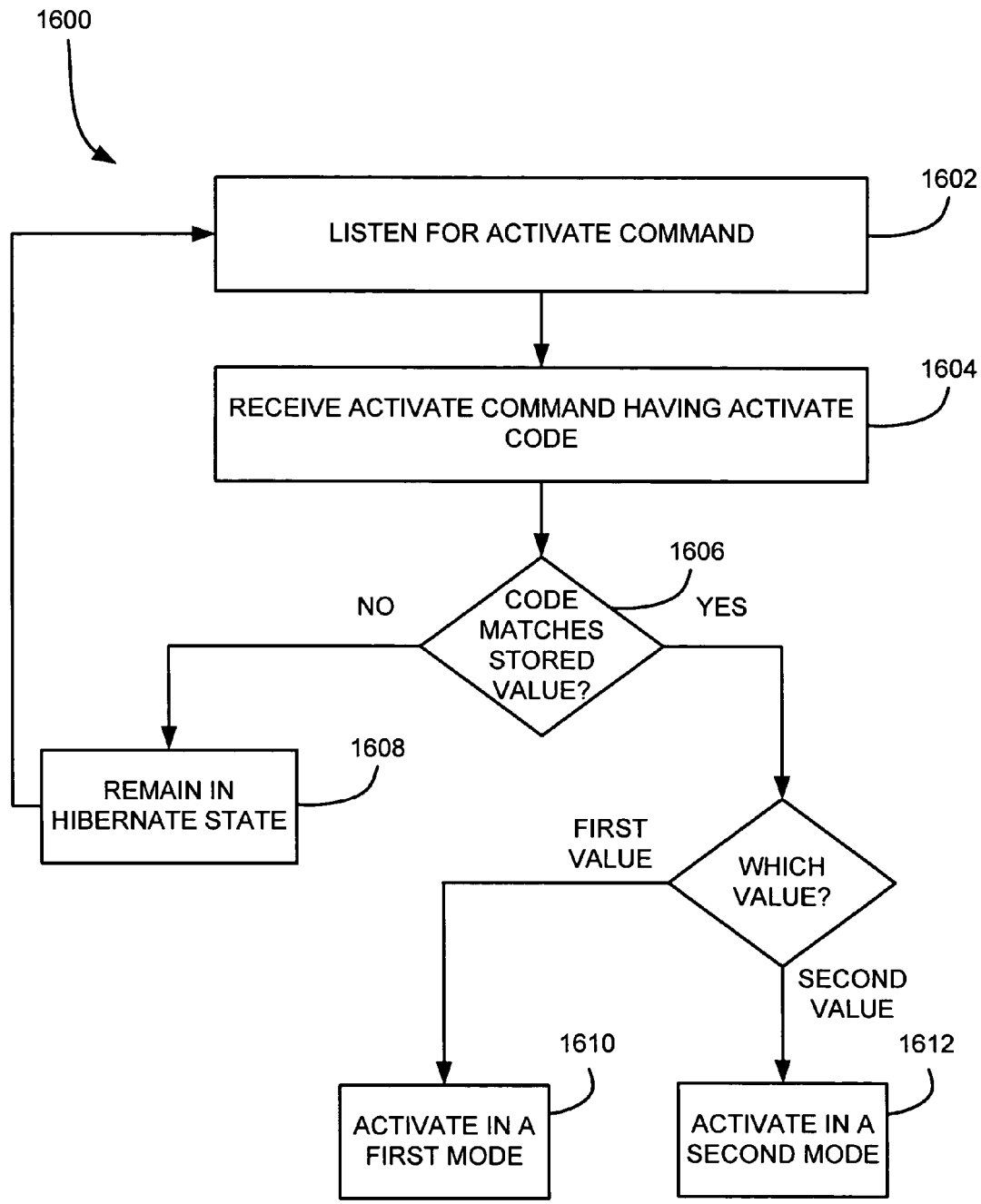
FIG. 16 is a flow diagram of a process for activating a device according to one embodiment.

FIG. 16 is a flow diagram of a process 1600 for activating a device as performed by a device such as an RFID tag in an RFID system of tags and an interrogator (reader). In operation 1602, the device listens for an activate command that has been selected and sent by an interrogator (e.g., reader). Again, the device is preferably in a low power mode, and may only be running enough of the circuit to recognize whether a command is a potential activate command. The activate command is received in operation 1604 and analyzed at decision 1606 to determine whether the activate code in the activate command matches a stored value. If not, the tag remains in its hibernate state in operation 1608, continuing to periodically or continuously monitor for another activate command. If the activate code matches a particular one of the values stored in the device, the device activates in a first mode in operation 1610. If the activate code matches another of the values stored in the device, the device activates in a second mode in operation 1612.

The modes can determine the initial state of the device for such things as optimized operation in different regulatory environments. Different countries designate different frequency bands for RFID. Accordingly, to make a "world" tag, or at least one that functions in two or more countries, the frequency capabilities of the tag must be large enough to encompass all of the various RF bands the tag may encounter. However, because the tags are essentially amplitude modulation (AM) receivers, tags with a wide frequency band will receive many rogue signals besides the carrier. An example of a problem that has been identified is that tags with a broad frequency receive range have been found to pick up local television broadcast signals in some locations, because the television signals have a horizontal scan rate that is similar to the tag data rate.

To solve this problem, separate activation codes can be used to initialize an RFID tag and optimize its performance for operation in different regulatory environments like USA, Europe, Japan, etc., where each venue designates a different frequency band for RFID. In this case, the RF input filters or resonance point of the antenna can be optimized for each of these regions. The activate command may not only tell the tag to activate, but also tell it to set its filter to the European band or the Japanese band.

The activate command would, of course, bypass the filter, as the filter has not yet been optimized. This is generally acceptable as the interrogator can again submit the activate command if it does not receive a response from the device and because the long 32 bit digital activation code prevents the tag from misinterpreting noise as a real signal. For example, if a tag supports 10 valid activate codes, the chance that it would misinterpret noise as a valid activate command is only 10 in 4 billion, or 0.0000025%. Also, in a preferred embodiment, the activate command is sent at a low frequency with a narrow modulation filter on the tag that further reduces noise sensitivity, and the optimization portion of the activate command defines how the device receives and processes incoming signals and also how it communicates with the reader during subsequent high frequency communications.

In other embodiments, security and privacy can be improved by using some activation codes to wake a tag up in normal operation and other activation codes to wake the tag up in a private mode where the tag avoids backscattering identity information to the reader. Accordingly, the reader can be instructed (by the user or programming) to select an "activate public" command or an "activate private" command. The activate public command can be used to initiate normal communications. The activate private command, on the other hand, triggers the tag to perform discretely. For instance, the tag may listen and not respond, may initiate in a secure mode under a security protocol, may only transmit select information, etc. The tag could also respond with a random number, indicating that the tag has received the message without disclosing any information about the tag.

Figure 17:
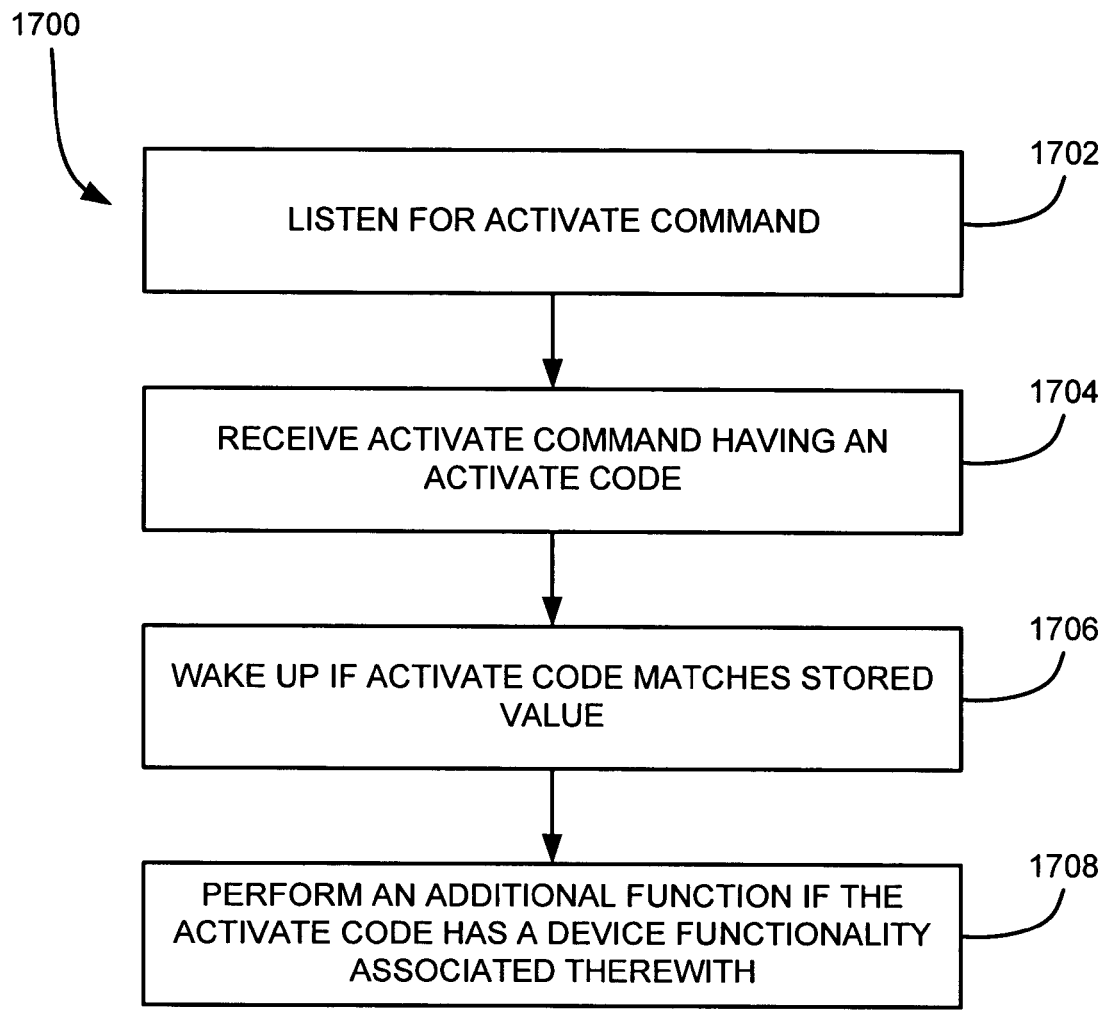
FIG. 17 is a flow diagram of a process for activating a device according to one embodiment.

FIG. 17 is a flow diagram of another process 1700 for activating a device as performed by a device such as an RFID tag in an RFID system of tags and an interrogator (reader). In this case, the tag stores "activate" values, at least some of which have additional device functionality associated with it/them (the additional functionality being in addition to activating the device). In operation 1702, the device listens for an activate command sent by the interrogator. Upon receiving the activate command in operation 1704, the activate circuit wakes up the device in operation 1706 if the activate code matches one of the "activate" values stored in the device. In operation 1708, the device performs an additional function if the activate code matches one of the stored values that has additional device functionality associated therewith.

This process 1700, for example, is a variation on the private and open modes of operation, discussed above. Here, if the activate command matches a certain stored value, this causes the tag to not only wake up, but also execute a security protocol such as encryption for subsequent communications, generate a random number rather than backscatter identification information, etc. In the embodiment shown in FIG. 2, the encryption circuit 222 can be activated.

In a variation on the geographic-location-specific mode optimization process above, the activate command can include a payload section, such as the last 4 bits of the activate command or code, that the tag can compare to a look up table in its memory, and retrieve the optimal frequency range for that geographical location from the matching entry in the table.

Another example of use includes sending an activate command to a tag, where the activate command indicates that the tag should return battery usage information, e.g., from the battery monitor subcircuit 215 in the embodiment of FIG. 2. In yet another example, the activate command instructs a tag to initiate a sensor. Note that in these scenarios, as well as in any of the other embodiments, the entire tag need not be activated, only the components of the tag needed to provide the desired reply to the interrogator or perform the desired function.

Figure 18:
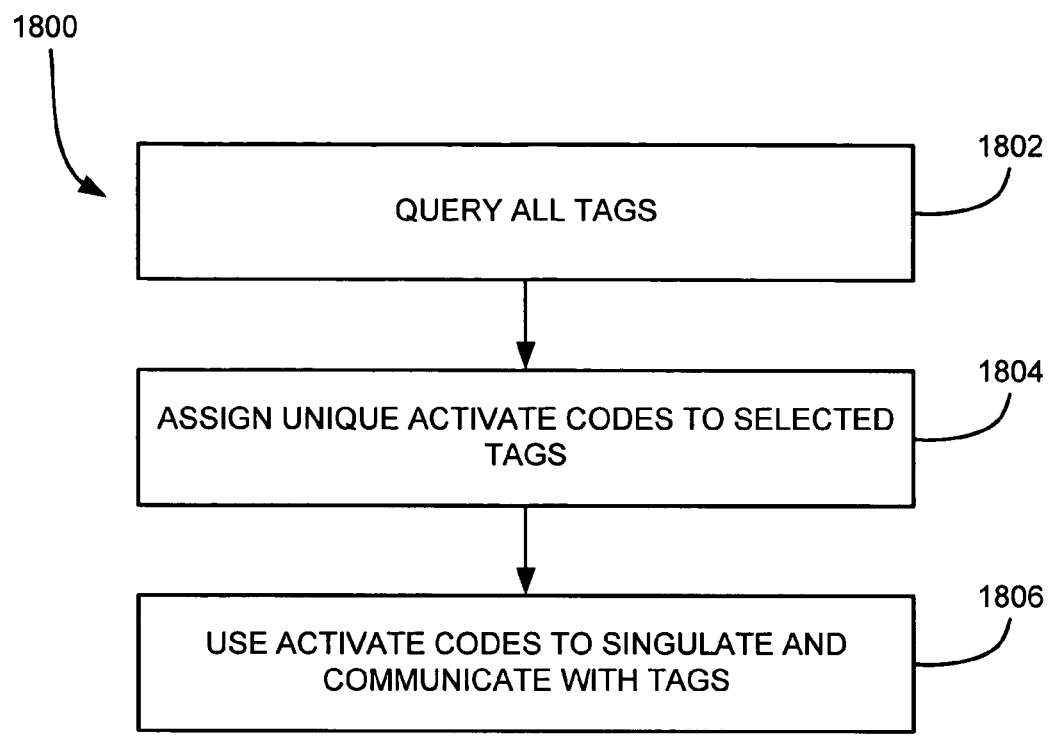
FIG. 18 is a flow diagram of a process for activating selected remote devices according to an embodiment.

FIG. 18 is a flow diagram of a process 1800 for activating selected remote devices according to an embodiment. Power consumption can be radically reduced and battery life extended by having the reader initially query and identify all tags in its field in operation 1802, using the anti-collision protocol. However, the reader would then assign a unique activation code to each tag within its field in operation 1804 so that subsequent interaction with the tags (operation 1806) could bypass the singulation command sequence and directly communicate only with one tag at a time.

An example of a scenario in which the process 1800 of FIG. 18 can be used is with smart shelf labels, such as may someday be found in a grocery or retail store. In a typical prior art system, to update the label information, the reader would activate all, say 30,000 tags at once and then use an anticollision protocol to sort though the tags one by one. Meanwhile, all 30,000 tags are active waiting for their command, and are consuming power. This is very inefficient.

A solution according to one embodiment is to perform a universal activate once, activating all tags in the store. Then an activate code is assigned to particular tags, keeping track of which tag has been assigned which code in a table or database. The next time the reader wants to communicate with one of these specially marked tags, the reader can merely send out the newly assigned activate code. None of the other tags respond to that temporary number. So now the activate command functions as a singulate command, except that the reader no longer has to perform the standard singulation and anticollision protocol. Instead, the reader can directly singulate using the activate code itself. Thus, overall power consumption is reduced by orders of magnitude. Further, the response time is much faster, as the need to sort through each tag is greatly reduced or eliminated altogether.

A variation of the process 1800 of FIG. 18 is also useful in a physical storage situation, preferably where entry and removal of objects is rare, allowing the reader to take an inventory of the items in storage at will. When a new object is added to the storage area, the reader could again sort through all tags, and then assign unique activate codes to all tags in the field. Or the reader could activate all tags, singulate those tags with unique codes already assigned thereto and instruct them to sleep, and then assign new codes to those tags still responding.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for activating a device, comprising:
listening for an activate command at a device;
receiving the activate command, the activate command including an activate code;
activating the device in a first high power mode if the activate code matches one of a plurality of values stored in the device; and
activating the device in a second high power mode if the activate code matches another of the plurality of values stored in the device,
wherein activating the device includes the steps in the device of:
listening, in a low power mode, for the activate command,
receiving a signal that may or may not be the activate command,
determining based on an interrupt signal whether the signal is the activate command, and
powering up the device in the corresponding high power mode if the activate code is determined to match one of the plurality of prestored values.

2. A method as recited in claim 1, wherein activating the device in one of the modes includes setting an initial state of the device.

3. A method as recited in claim 1, wherein the first and second modes relate to how the device functions in a specified regulatory environment.

4. A method as recited in claim 3, wherein a resonance point of an antenna of the device is adjusted to improve its performance for one regulatory environment when in the first mode, wherein the resonance point of the antenna of the device is adjusted to improve its performance for another regulatory environment when in the second mode.

5. A method as recited in claim 1, wherein the mode dictates how the device receives and processes wireless signals received by the device subsequent to receiving the activate command.

6. A method as recited in claim 5, wherein the activate command is received wirelessly at a lower frequency, wherein wireless signals received subsequent to receiving the activate command are at a higher frequency.

7. A method as recited in claim 1, wherein the second mode is more secure than the first mode.

8. A method as recited in claim 7, wherein the device executes a security protocol when in the second mode, wherein the device does not execute a security protocol when in the first mode.

9. A method as recited in claim 7, wherein the device sends identification information about the device when in the first mode, wherein the device does not send identification information about the device when in the second mode.

10. A method as recited in claim 1, wherein the method is performed by a radio frequency identification (RFID) tag.

11. A method as recited in claim 1, wherein the method is performed by several RFID tags, several of the tags being activated upon receiving a particular activate command.

12. A method as recited in claim 1, wherein the method is implemented in multiple devices.

13. A method as recited in claim 1, wherein one particular activate code instructs the device to respond to all querying devices.

14. A method as recited in claim 1, wherein the activate command further includes an interrupt period, wherein the activate code is only analyzed if the interrupt period matches a predetermined value or falls within a predetermined range.

15. A method as recited in claim 1, wherein the activate command further includes a preamplifier centering sequence, wherein the preamplifier centering sequence is about a 50% duty cycle waveform.

16. A method as recited in claim 1, wherein the activate code is a digital code.

17. A Radio Frequency Identification (RFID) system, comprising:
a plurality of RFID tags performing the method of claim 1; and
an RFID interrogator in communication with the RFID tags.

18. A method for activating a device, comprising:
listening while operating in a low power state, for an activate command at a device; receiving the activate command, the activate command including an activate code;
activating the device in a first high power mode if the activate code matches one of a plurality of values stored in the device wherein at least one functional component related to the first mode of the device is selectively coupled to a power source during the activating the device in the first mode; and
activating the device in a second high power mode if the activate code matches another of the plurality of values stored in the device, wherein at least one functional component related to the second mode of the device is selectively coupled to a power source during the activating the device in the second mode, wherein the first and second modes relate to how the device functions in a specified regulatory environment, wherein a radio frequency input filter of the device is adjusted to improve its filtering for one specified regulatory environment when in the first mode, wherein the radio frequency input filter of the device is adjusted to improve its filtering for another specified regulatory environment when in the second mode.

19. A method for activating a remote device, comprising:

selecting an activate command for sending to a remote device, wherein the activate command indicates which of a plurality of high power modes the remote device will activate in;

sending the activate command to the remote device while it is in a low power mode for causing the remote device to recognize the activate command from a plurality of stored activation codes and cause the remote device to generate at least one wake up signal to activate the remote device in one of the plurality of high power modes if the activate code is determined to match one of the plurality of prestored values.

20. A method as recited in claim 19, wherein the method is performed by a radio frequency identification (RFID) interrogator.

21. A method for activating a device, comprising:

listening, while operating in a low power state for an activate command at a device;

receiving the activate command, the activate command including an activate code;

activating the device in a higher power state if the activate code matches one of a plurality of values stored in the device, wherein at least one of the stored values has an additional device functionality associated therewith; and performing an additional function if the activate code matches one of the stored values having additional device functionality associated therewith, wherein activating the device includes the steps in the device of:

listening, in a low power mode, for the activate command, receiving a signal that may or may not be the activate command, determining based on an interrupt signal whether the signal is the activate command, and powering up the device in the corresponding high power mode if the activate code is determined to match one of the plurality of prestored values.

22. A method as recited in claim 21, wherein the additional function includes setting a state of the device.

23. A method as recited in claim 22, wherein setting the state of the device includes tailoring performance of the device for a specified regulatory environment.

24. A method as recited in claim 23, wherein a resonance point of an antenna of the device is adjusted to improve its performance for the specified regulatory environment.

25. A method as recited in claim 21, wherein the additional function defines how the device receives and processes wireless signals received by the device subsequent to receiving the activate command.

26. A method as recited in claim 25, wherein the activate command is received wirelessly at a lower frequency, wherein wireless signals received subsequent to receiving the activate command are at a higher frequency.

27. A method as recited in claim 21, wherein the additional function is execution of a security protocol.

28. A method as recited in claim 21, wherein the additional function is execution of a privacy protocol.

29. A method as recited in claim 21, wherein the method is performed by a radio frequency identification (RFID) tag.

30. A method as recited in claim 21, wherein the method is performed by several RFID tags, several of the tags being activated upon receiving a particular activate command.

31. A method as recited in claim 21, wherein the method is implemented in multiple devices.

32. A method as recited in claim 21, wherein one particular activate code instructs the device to respond to all querying devices.

33. A method as recited in claim 21, wherein one particular activate code instructs the device to reply with battery usage information.

34. A method as recited in claim 21, wherein the activate command further includes an interrupt period, wherein the activate code is only analyzed if the interrupt period matches a predetermined value or falls within a predetermined range.

35. A method as recited in claim 21, wherein the activate command further includes a preamplifier centering sequence, wherein the preamplifier centering sequence is about a 50% duty cycle waveform.

36. A method as recited in claim 21, wherein the activate code is a digital code.

37. A Radio Frequency Identification (RFID) system, comprising:

a plurality of RFID tags performing the method of claim 21; and an RFID interrogator in communication with the RFID tags.

38. A method for activating a device, comprising:

listening for an activate command at a device while in a low power mode;

receiving the activate command, the activate command including an activate code;

activating the device in a high power mode, if the activate code matches one of a plurality of values stored in the device, wherein at least one of the stored values has an additional device functionality associated therewith; and performing an additional function if the activate code matches one of the stored values having additional device functionality associated therewith, wherein the additional function includes selling a state of the device, wherein selling the state of the device includes tailoring performance of the device for a specified regulatory environment, wherein a radio frequency input filter of the device is adjusted to improve its filtering for the specified regulatory environment.

39. A method for activating a remote device, comprising:

selecting an activate command for sending to a remote device, the activate command including an activate code, wherein the activate command causes the remote device to generate at least one wake up signal to activate at least one functional component of the remote device if the activate code matches one of a plurality of values stored in the remote device, wherein at least one of the stored values has an additional device functionality associated therewith, wherein an additional function is performed by the device if the activate code matches one of the stored values having additional device functionality associated therewith; and sending the activate command to the remote device wherein activating the device includes the steps in the device of:
listening, at the device, in a low power mode, for the activate command,
receiving at the device a signal that may or may not be the activate command,
determining at the device based on an interrupt signal whether the signal is the activate command, and
powering up the device in the corresponding high power mode if the activate code is determined to match one of the plurality of prestored values.

40. A method as recited in claim 39, wherein the method is performed by a radio frequency identification (RFID) interrogator.

41. A method for activating selected remote devices, comprising:
identifying each of a plurality of remote devices;
assigning an activate code to at least some of the remote devices, wherein at least one functional component of at least one remote device is selectively coupled to a power source which causes the component to become subsequently activated upon receiving an activate command having a code matching the activate code assigned thereto;
communicating with one of the remote devices, wherein the communication with the one of the remote devices is prefaced, with a code matching the activate code for the one of the remote devices
wherein activating the device includes the steps in the device of:
listening, at the device, in a low power mode, for the activate command,
receiving at the device a signal that may or may not be the activate command,
determining at the device based on an interrupt signal whether the signal is the activate command, and
powering up the device in the corresponding high power mode if the activating code is determined to match the prestored value.

42. A method as recited in claim 41, wherein the method is performed by a radio frequency identification (RFID) interrogator.

43. A method as recited in claim 41, wherein the remote devices are RFID tags.

44. A method as recited in claim 41, wherein the remote devices are RFID enabled shelf labels.

45. A method as recited in claim 41, wherein a unique activate code is assigned to each of the remote devices within a field of operation.

46. A method as recited in claim 45, wherein the method is performed by a radio frequency identification (RFID) interrogator, wherein the remote devices are RFID tags.

47. A method as recited in claim 41, wherein several of the remote devices are activated with a particular activate code.

48. A method as recited in claim 41, wherein one particular activate code activates all of the remote devices.

49. A method as recited in claim 41, wherein each particular activate code activates only one of the remote devices.

50. A method as recited in claim 41, wherein one particular activate code bypasses an activate circuit of one of the remote devices.

51. A method as recited in claim 41, wherein an activate circuit of each of the remote devices compares the activate code to the prestored value and activates the device if the activate code matches the prestored value.

52. A Radio Frequency Identification (RFID) system, comprising:
a plurality of RFID tags; and
an RFID interrogator in communication with the RFID tags, the RFID interrogator performing the method of claim 41.

53. A method for communicating with a device, comprising:
listening for a command at a device while in a low power mode;
receiving the command, the command including a code;
recognizing the code from a plurality of stored codes and causing the device to generate at least one wake-up signal to activate the device in a first higher power mode if the code matches one of a plurality of values stored in the device; and
recognizing the code from a plurality of stored codes and causing the device to generate at least one wake-up signal to activate the device in a second higher power mode if the code matches another of the plurality of values stored in the device
wherein activating the device includes the steps in the device of:
listening, in a low power mode, for the activate command,
determining based on an interrupt signal whether the signal is the activate command, and
powering up the device in the corresponding high power mode if the activate code is determined to match one of the plurality of prestored values.

54. A method as recited in claim 53, wherein the first and second modes relate to how the device functions in a specified regulatory environment.

55. A method as recited in claim 53, wherein the mode dictates how the device receives and processes wireless signals received by the device subsequent to receiving the command.

56. A method as recited in claim 55, wherein the activate command is received at a lower frequency, wherein the wireless signals received subsequent to receiving the activate command are at a higher frequency.

57. A method as recited in claim 53, wherein the second mode is more secure than the first mode.

58. A method as recited in claim 57, wherein the device executes a security protocol when in the second mode, wherein the device does not execute a security protocol when in the first mode.

59. A method as recited in claim 57, wherein the device sends identification information about the device when in the first mode, wherein the device does not send identification information about the device when in the second mode.

60. A method as recited in claim 53, wherein the method is performed by a radio frequency identification (RFID) tag.

61. A method as recited in claim 53, wherein the method is performed by several RFID tags, several of the tags being activated upon receiving a particular activate command.

62. A method as recited in claim 53, further comprising not responding, and not changing state, if the code does not match any of the plurality of values stored in the device.

63. A Radio Frequency Identification (RFID) system, comprising:
a plurality of RFID tags performing the method of claim 53; and
an RFID interrogator in communication with the RFID tags.

* * * * *

UNITED STATES PATENT AND TRADEMARK OFFICE
CERTIFICATE OF CORRECTION

PATENT NO. : 7,604,178 B2  Page 1 of 1
APPLICATION NO. : 11/127910
DATED : October 20, 2009
INVENTOR(S) : Roger Green Stewart It is certified that error appears in the above-identified patent and that said Letters Patent is hereby corrected as shown below:

col. 5 line 22-23 change "U.S. patent application" to --US Patent Application--;
    col. 6 line 11 change "U.S. patent application" to --US Patent Application--;
    col. 6 line 12 change "Ser." to --Serial--;
    col. 6 line 31 change "U.S. patent application" to --US Patent Application--;
    col. 6 line 32 change "Jul." to --July--.

Signed and Sealed this

Twenty-sixth Day of January, 2010

David J. Kappos
*Director of the United States Patent and Trademark Office*